United States Patent
Lam et al.

(10) Patent No.: US 9,824,011 B2
(45) Date of Patent: Nov. 21, 2017

(54) METHOD AND APPARATUS FOR PROCESSING DATA AND COMPUTER SYSTEM

(71) Applicant: Huawei Technologies Co., Ltd., Shenzhen (CN)

(72) Inventors: Kingtin Lam, Pokfulam (HK); Jinghao Shi, Pokfulam (HK); Cho-li Wang, Pokfulam (HK); Wangbin Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/880,587

(22) Filed: Oct. 12, 2015

(65) Prior Publication Data
US 2016/0034397 A1   Feb. 4, 2016

Related U.S. Application Data

(63) Continuation of application No. PCT/CN2013/087402, filed on Nov. 19, 2013.

(30) Foreign Application Priority Data

Apr. 16, 2013  (CN) .......................... 2013 1 0131430

(51) Int. Cl.
*G06F 12/08* (2016.01)
*G06F 11/14* (2006.01)
(Continued)

(52) U.S. Cl.
CPC .......... *G06F 12/0817* (2013.01); *G06F 9/544* (2013.01); *G06F 11/1448* (2013.01);
(Continued)

(58) Field of Classification Search
CPC .. G06F 12/0842; G06F 12/0817; G06F 9/544; G06F 11/1448; G06F 17/30979
(Continued)

(56) References Cited

U.S. PATENT DOCUMENTS 8,868,848 B2 * 10/2014 Gao ........................ G06F 9/466
707/695
9,600,412 B1 * 3/2017 Aingaran ................ G06F 12/10
(Continued)

FOREIGN PATENT DOCUMENTS

| CN | 1818874 A | 8/2006 |
|---|---|---|
| CN | 101430705 A | 5/2009 |

(Continued)

OTHER PUBLICATIONS

Iftode, L., et al., "Scope Consistency: A Bridge between Release Consistency and Entry Consistency," SPAA, Annual ACM Symposium on Parallel Algorithms and Architectures, Jun. 24, 1996, pp. 277-287.
(Continued)

*Primary Examiner* — Jasmine Song
(74) *Attorney, Agent, or Firm* — Conley Rose, P.C.

(57) ABSTRACT

A method and an apparatus for processing data and a computer system are provided. The method includes copying a shared virtual memory page to which a first process requests access into off-chip memory of a computing node, and using the shared virtual memory page copied into the off-chip memory as a working page of the first process; and before the first process performs a write operation on the working page, creating, in on-chip memory of the computing node, a backup page of the working page, so as to back up original data of the working page. Before a write operation is performed on a working page, page data is backed up in the on-chip memory, so as to ensure data consistency (Continued)

when multiple processes perform an operation on a shared virtual memory page while accessing off-chip memory as less as possible and improving a speed of a program.

11 Claims, 9 Drawing Sheets

(51) Int. Cl.
  *G06F 12/0817* (2016.01)
  *G06F 12/0842* (2016.01)
  *G06F 9/54* (2006.01)
  *G06F 17/30* (2006.01)
  *G06F 11/16* (2006.01)

(52) U.S. Cl.
  CPC .... *G06F 12/0842* (2013.01); *G06F 17/30979* (2013.01); *G06F 11/1666* (2013.01); *G06F 2201/885* (2013.01); *G06F 2212/1016* (2013.01); *G06F 2212/1032* (2013.01); *G06F 2212/621* (2013.01)

(58) Field of Classification Search
  USPC .......................................................... 711/119
  See application file for complete search history.

(56) References Cited

U.S. PATENT DOCUMENTS

| | | |
|---|---|---|
| 2006/0143361 A1 | 6/2006 | Kottapalli et al. |
| 2011/0235508 A1 | 9/2011 | Goel et al. |
| 2011/0265090 A1 | 10/2011 | Moyer et al. |

FOREIGN PATENT DOCUMENTS

| | | |
|---|---|---|
| CN | 102907055 A | 1/2013 |
| WO | 2011090515 A2 | 7/2011 |

OTHER PUBLICATIONS

Huang, H, et al., "A Synchronization-Based Alternative to Directory Protocol," IEEE International Symposium on Parallel and Distributed Processing with Applications, Aug. 10, 2009, pp. 175-181.

Zhou, X., et aL, "A Case for Software Managed Coherence in Many-core Processors," Intel Corporation, Proceedings of the 2nd USENIZ Workshop on Hot Topics in Parallelism, Retrieved from the Internet: URL:http://static.useniz.org/event/hotpar10/tech/full_papers/Zhou.pdf [retrieved on Mar. 31, 2016], Jan. 2010, 6 pages.

Lankes, S., et al., "The Path to MetalSVM: Shared Virtual Memory for the SCC," Proceedings of the 4th Manycore Applications Research Community (MARC) Symposium, Retrieved from the Internet: URL:http://www.researchgate.net/profile/Pablo_Reble/publication/234291097_The_Path_to_MetalSVM_Shared_Virtual_Memory_for_the_SCC/links/0deec5294ba8251bda000000.pdf [retrieved on Mar. 31, 2016], Jan. 2011, 8 pages.

Kim, J., et aL, "An Efficient Software Shared Virtual Memory for the Single-chip Cloud Computer," APSys, Proceedings of the Second Asia-Pacific Workshop on Systems, Jul. 11-12, 2011, 5 pages.

Foreign Communication From a Counterpart Application, European Application No. 13882376.0, Extended European Search Report dated Apr. 11, 2016, 11 pages.

Foreign Communication From a Counterpart Application, PCT Application No. PCT/CN2013/087402, English Translation of International Search Report dated Feb. 20, 2014, 3 pages.

Foreign Communication From a Counterpart Application, PCT Application No. PCT/CN2013/087402, Written Opinion dated Feb. 20, 2014, 5 pages.

\* cited by examiner

| Twin Page Id | Twin Page Version | Twin Page Usage | Twin Page Address |

METHOD AND APPARATUS FOR PROCESSING DATA AND COMPUTER SYSTEM

CROSS-REFERENCE TO RELATED APPLICATIONS

This application is a continuation of International Application No. PCT/CN2013/087402, filed on Nov. 19, 2013, which claims priority to Chinese Patent Application No. 201310131430.2, filed on Apr. 16, 2013, both of which are hereby incorporated by reference in their entireties.

TECHNICAL FIELD

The present disclosure relates to the field of computer technologies, and in particular, to a method and an apparatus for processing data and a computer system.

BACKGROUND

In a multi-core processor, because processor cores all maintain their caches in a manner in which memory is shared, a problem of cache incoherence frequently occurs. This case happens when caches of different processor cores store data that corresponds to a same physical memory address but has different content. For example, in a shared memory system of a multi-core processor including processor cores A and B, each processor core maintains an independent Cache resource. It is assumed that the processor core A and the processor core B read data from a same physical memory address, that is, the data read by the two processor cores corresponds to a same physical memory unit. If the processor core A writes data to this address later, a Cache of the processor core A is updated while a Cache of the processor core B still stores previous data, thereby causing a problem of inconsistency of cached content.

In a conventional multi-core processor, a cache coherence issue is generally resolved by using a hardware cache coherence protocol. Common hardware cache coherence protocols include a Bus Sniffing, a directory structure based protocol, a token based protocol, and the like. However, as a quantity of cores of a many-core chip increases, costs of hardware cache coherence grow linearly with the increase of the core quantity, and even benefits brought by the increase of the core quantity are finally offset. The costs of hardware cache coherence mainly include several aspects as follows.

(1) Communication costs: To implement cache coherence, state update needs to be performed using a cache communication protocol, where researches show that on-chip communication traffic of a system implementing the hardware cache coherence protocol is 20% higher than that of a system implementing a non-cache coherence protocol, and as the core quantity increases, the situation deteriorates.

(2) Difficulties in design and verification: It is extremely difficult to implement state synchronization between hundreds of cores, and design complexity sharply increases design and verification costs.

Although the foregoing problem can be mitigated by using some smarter design, the problem cannot be thoroughly resolved. Therefore, software cache coherence is selected instead of hardware cache coherence, for example, many-core research chips such as a single chip cloud computer (SCC) and Teraflops of Intel® have eventually given up hardware cache coherence implementation.

A distributed shared memory (DSM) model is a mainstream memory model for implementing software cache coherence. As shown in FIG. 1, in this memory model, processes of an application program have same shared virtual memory, and each process separately maps some or all virtual memory pages in the shared virtual memory to a private physical memory space maintained by the process. Each process sees a complete shared virtual memory space from a user plane, and does not perceive that shared data included in a virtual memory page in the shared virtual memory space is actually in a private physical memory space maintained by another process. Each process may perform any data operation on the shared virtual memory, and a bottom layer of the DSM performs data synchronization between the processes using an on-chip network or shared physical memory, which can be accessed by all the processes, of a system. Multiple processes of an application program may run on one processor core, or each process may run on one separate processor core.

A scope coherence protocol is a mainstream DSM-based software cache coherence protocol, and has advantages of being simple and highly efficient. In an application program, ranges in which code is protected by Acquire(lock)/Release (lock) using a same lock belong to a same scope. The scope coherence protocol ensures only that shared variables in a same scope are synchronous, and shared variables in different scopes may be not synchronous. Moreover, in the scope coherence protocol, consistency of shared data in a same scope is generally maintained using a Twin/Diff (backup/comparison) mechanism. An existing Twin/Diff mechanism is implemented based on off-chip memory of a multi-core platform, where a Twin page is a page for backing up a current working page, when space of a cache is insufficient, the Twin page is stored in local off-chip memory, and after a process completes a write operation on the working page, a diff comparison operation is performed on the modified working page and the Twin page, and a comparison result is sent to a home process of the working page, such that the home process updates the working page.

In the existing Twin/Diff mechanism, if a program accesses a large quantity of pages in a Scope, because of a limitation from a size of a cache, according to a cache replacement algorithm, a page accessed later removes a page (a working page and a Twin page) accessed earlier from the cache; in this way, when the program exits the Scope, when a Diff operation is performed for the page accessed earlier, it is required to reload the working page and the Twin page from off-chip memory to the cache, which causes large off-chip access load while increasing a data access latency and affecting execution efficiency of the program.

SUMMARY

Embodiments of the present disclosure provide a method and an apparatus for processing data and a computer system, so as to ensure data consistency during access to a shared virtual memory page while reducing a data access latency and improving execution efficiency of a program.

According to a first aspect, an embodiment of the present disclosure provides a method for processing data, including copying a shared virtual memory page to which a first process requests access into off-chip memory of a computing node, and using the shared virtual memory page copied into the off-chip memory as a working page of the first process, where the shared virtual memory page is a virtual memory page in shared virtual memory of an application program to which the first process belongs, and the application program runs on the computing node; and, before the first process performs a write operation on the working page, creating a backup page of the working page, and storing the created backup page into on-chip memory of the computing node, so as to back up original data of the working page.

In a first possible implementation manner of the first aspect, a quantity of shared virtual memory pages is N, where N is a positive integer greater than or equal to 1; and a quantity of working pages of the first process is M, where M is a positive integer greater than or equal to 1; and, before the storing of the created backup page into on-chip memory of the computing node, the method further includes determining whether remaining space of the on-chip memory is less than a first threshold, and if the remaining space of the on-chip memory is less than the first threshold, triggering the first process to synchronously update modified content in the M working pages of the first process into the M shared virtual memory pages corresponding to the M working pages, and release space occupied by backup pages of the M working pages in the on-chip memory; or if the remaining space of the on-chip memory is greater than or equal to the first threshold, performing the step of storing the created backup page into on-chip memory of the computing node.

With reference to the first possible implementation manner of the first aspect, in a second possible implementation manner, before the creating of a backup page of the working page, the method further includes allocating in advance an on-chip storage scope of a specific size in the on-chip memory of the computing node to the first process; and the storing of the created backup page into on-chip memory of the computing node includes storing the created backup page into the on-chip storage scope that is allocated in advance to the first process.

With reference to the second possible implementation manner of the first aspect, in a third possible implementation manner, it is determined whether remaining space of the on-chip memory is less than a first threshold, and if the remaining space of the on-chip memory is less than the first threshold, triggering the first process to synchronously update modified content in the M working pages of the first process into the M shared virtual memory pages corresponding to the M working pages, and release space occupied by backup pages of the M working pages in the on-chip memory; or if the remaining space of the on-chip memory is greater than or equal to the first threshold, performing the step of storing the created backup page into on-chip memory of the computing node includes determining whether the remaining space of the on-chip storage scope of the first process is less than a size of the created backup page or is less than a second threshold, and if the remaining space of the on-chip storage scope of the first process is less than the size of the created backup page or is less than the second threshold, triggering the first process to synchronously update the modified content in the M working pages of the first process into the M shared virtual memory pages corresponding to the M working pages, and release the space occupied by the backup pages of the M working pages in the on-chip memory; or if the remaining space of the on-chip storage scope of the first process is greater than or equal to the size of the created backup page or is greater than or equal to the second threshold, performing the step of storing the created backup page into on-chip memory of the computing node.

With reference to the first possible implementation manner of the first aspect, in a fourth possible implementation manner, the first threshold is a size of the created backup page.

With reference to the fourth possible implementation manner of the first aspect, in a fifth possible implementation manner, the method for processing data further includes, if the remaining space of the on-chip memory of the computing node is less than the size of the created backup page, triggering another at least one process in the application program except the first process to synchronously update modified content in working pages of the other at least one process into shared virtual memory pages corresponding to the working pages, and release space occupied by backup pages of the working pages in the on-chip memory.

With reference to the first possible implementation manner of the first aspect, in a sixth possible implementation manner, the on-chip memory of the computing node includes multiple independent storage scopes, all processes of the application program are divided into at least one process group, and processes in each process group share one storage scope in the multiple independent storage scopes, such that the storage scope is used as an on-chip common buffer of the process group; the storing of the created backup page into on-chip memory of the computing node includes storing the created backup page into an on-chip common buffer of a process group in which the first process is located; and determining whether remaining space of the on-chip memory is less than a first threshold, and if the remaining space of the on-chip memory is less than the first threshold, triggering the first process to synchronously update modified content in the M working pages of the first process into the M shared virtual memory pages corresponding to the M working pages, and release space occupied by backup pages of the M working pages in the on-chip memory; or if the remaining space of the on-chip memory is greater than or equal to the first threshold, performing the step of storing the created backup page into on-chip memory of the computing node includes determining whether the remaining space of the on-chip common buffer of the process group in which the first process is located is less than a size of the created backup page or is less than the second threshold, and if the remaining space of the on-chip common buffer of the process group in which the first process is located is less than the size of the created backup page or is less than the second threshold, triggering the first process to synchronously update the modified content in the M working pages of the first process into the M shared virtual memory pages corresponding to the M working pages, and releasing the space occupied by the backup pages of the M working pages in the on-chip memory; or if the remaining space of the on-chip common buffer of the process group in which the first process is located is greater than or equal to the size of the created backup page or is greater than or equal to the second threshold, performing the step of storing the created backup page into on-chip memory of the computing node.

With reference to the first, second, third, fourth, fifth, or sixth possible implementation manner of the first aspect, in a seventh possible implementation manner, the method for processing data further includes, before the creating of a backup page of the working page, querying the on-chip memory of the computing node for the backup page of the working page; and the creating of a backup page of the working page includes, if no backup page of the working page is found in the on-chip memory of the computing node, creating the backup page of the working page.

With reference to the seventh possible implementation manner of the first aspect, in an eighth possible implementation manner, the on-chip memory of the computing node stores a backup page information table, where the backup page information table includes metadata information of all backup pages in the on-chip memory, and metadata information of each backup page includes a page number and a version number of each backup page, and the page number and the version number of each backup page are respectively the same as a page number and a version number of a working page corresponding to each backup page; and the querying of the on-chip memory of the computing node for the backup page of the working page includes querying the backup page information table for metadata information of which a page number and a version number are respectively the same as a page number and a version number of the working page; and the creating of a backup page of the working page includes, if no metadata information of which a page number and a version number are respectively the same as the page number and the version number of the working page is found in the backup page information table, creating the backup page of the working page.

According to a second aspect, an embodiment of the present disclosure further provides another method for processing data, including copying a shared virtual memory page to which a first process requests access into off-chip memory of a computing node, and using the shared virtual memory page copied into the off-chip memory as a working page of the first process, where the shared virtual memory page is a virtual memory page in shared virtual memory of an application program to which the first process belongs, and the application program runs on the computing node; and, before the first process performs a write operation on the working page, querying on-chip memory of the computing node for a backup page of the working page, and if a backup page of the working page is found, determining the found backup page as a backup page of the working page.

In a first possible implementation manner of the second aspect, the method for processing data further includes, if no backup page of the working page is found, creating a backup page of the working page, and storing the created backup page into the on-chip memory of the computing node.

With reference to the first possible implementation manner of the second aspect, in a second possible implementation manner, a quantity of shared virtual memory pages is N, where N is a positive integer greater than or equal to 1; and a quantity of working pages of the first process is M, where M is a positive integer greater than or equal to 1; and, before the storing of the created backup page into the on-chip memory of the computing node, the method further includes determining whether remaining space of the on-chip memory is less than a first threshold, and if the remaining space of the on-chip memory is less than the first threshold, triggering the first process to synchronously update modified content in the M working pages of the first process into the M shared virtual memory pages corresponding to the M working pages, and release space occupied by backup pages of the M working pages in the on-chip memory; or if the remaining space of the on-chip memory is not less than the first threshold, performing the step of storing the created backup page into the on-chip memory of the computing node.

With reference to the first or second possible implementation manner of the second aspect, in a third possible implementation manner, the on-chip memory of the computing node stores a backup page information table, where the backup page information table includes metadata information of all backup pages in the on-chip memory, and metadata information of each backup page includes a page number and a version number of each backup page, and the page number and the version number of each backup page are respectively the same as a page number and a version number of a working page corresponding to each backup page; and the querying of on-chip memory of the computing node for a backup page of the working page, and if a backup page of the working page is found, determining the found backup page as a backup page of the working page includes querying the backup page information table for metadata information of which a page number and a version number are respectively the same as a page number and a version number of the working page, and if metadata information of which a page number and a version number are respectively the same as the page number and the version number of the working page is found, determining a backup page corresponding to the found metadata information as the backup page of the working page.

With reference to the first or second possible implementation manner of the second aspect, in a fourth possible implementation manner, the on-chip memory includes multiple independent storage scopes, all processes of the application program are divided into at least one process group, and processes of each process group share one storage scope in the multiple independent storage scopes, such that the storage scope is used as an on-chip common buffer of the process group, and each process group has one separate backup page information table; and the backup page information table of each process group includes metadata information of all backup pages of all processes in the process group, and metadata information of each backup page includes a page number and a version number of each backup page, and the page number and the version number of each backup page are respectively the same as a page number and a version number of a working page corresponding to each backup page; and the querying of on-chip memory of the computing node for a backup page of the working page, and if a backup page of the working page is found, determining the found backup page as a backup page of the working page includes querying a backup page information table of a process group in which the first process is located for metadata information of which a page number and a version number are respectively the same as a page number and a version number of the working page, and if metadata information of which a page number and a version number are respectively the same as the page number and the version number of the working page is found, determining a backup page corresponding to the found metadata information as the backup page of the working page.

According to a third aspect, an embodiment of the present disclosure further provides an apparatus for processing data, including a copy unit configured to copy a shared virtual memory page to which a first process requests access into off-chip memory of a computing node, and use the shared virtual memory page copied into the off-chip memory as a working page of the first process, where the shared virtual memory page is a virtual memory page in shared virtual memory of an application program to which the first process belongs, and the application program runs on the computing node; and a backup unit configured to, before the first process performs a write operation on the working page, create a backup page of the working page, and store the created backup page into on-chip memory of the computing node, so as to back up original data of the working page.

In a first possible implementation manner of the third aspect, a quantity of shared virtual memory pages is N, where N is a positive integer greater than or equal to 1; and a quantity of working pages of the first process is M, where M is a positive integer greater than or equal to 1; and the apparatus for processing data further includes a determining unit configured to, before the backup unit stores the created backup page into the on-chip memory of the computing node, determine whether remaining space of the on-chip memory is less than a first threshold; and a trigger unit configured to, when the determining unit determines that the remaining space of the on-chip memory is less than the first threshold, trigger the first process to synchronously update modified content in the M working pages of the first process into the M shared virtual memory pages corresponding to the M working pages, and release space occupied by backup pages of the M working pages in the on-chip memory.

With reference to the first possible implementation manner of the third aspect, in a second possible implementation manner, the apparatus for processing data further includes a memory allocation unit configured to allocate in advance an on-chip storage scope of a specific size in the on-chip memory of the computing node to each process of the application program to which the first process belongs; and the backup unit is configured to store the created backup page into an on-chip storage scope that is allocated in advance by the memory allocation unit to the first process.

With reference to the second possible implementation manner of the third aspect, in a third possible implementation manner, the determining unit is configured to determine whether remaining space of the on-chip storage scope of the first process is less than a size of the created backup page or is less than a second threshold; and the trigger unit is configured to, when the determining unit determines that the remaining space of the on-chip storage scope of the first process is less than the size of the created backup page or is less than the second threshold, trigger the first process to synchronously update the modified content in the M working pages of the first process into the M shared virtual memory pages corresponding to the M working pages, and release the space occupied by the backup pages of the M working pages in the on-chip memory.

With reference to the first possible implementation manner of the third aspect, in a fourth possible implementation manner, processes of the application program share the on-chip memory of the computing node; the determining unit is configured to determine whether the remaining space of the on-chip memory of the computing node is less than a size of the created backup page; and the trigger unit is configured to, when the determining unit determines that the remaining space of the on-chip memory of the computing node is less than the size of the created backup page, trigger the first process to synchronously update the modified content in the M working pages of the first process into the M shared virtual memory pages corresponding to the M working pages, and release the space occupied by the backup pages of the M working pages in the on-chip memory.

With reference to the first, second, third, or fourth possible implementation manner of the third aspect, in a fifth possible implementation manner, the apparatus for processing data further includes a query unit configured to, before the backup unit creates the backup page of the working page, query the on-chip memory of the computing node for the backup page of the working page; and the backup unit is configured to, when the query unit finds no backup page of the working page in the on-chip memory of the computing node, create the backup page of the working page.

With reference to the fifth possible implementation manner of the third aspect, in a sixth possible implementation manner, the on-chip memory of the computing node stores a backup page information table, where the backup page information table includes metadata information of all backup pages in the on-chip memory, and metadata information of each backup page includes a page number and a version number of each backup page, and the page number and the version number of each backup page are respectively the same as a page number and a version number of a working page corresponding to each backup page; the query unit is configured to query the backup page information table for metadata information of which a page number and a version number are respectively the same as a page number and a version number of the working page; and the backup unit is configured to, when the query unit finds no metadata information of which a page number and a version number are respectively the same as the page number and the version number of the working page in the backup page information table, create the backup page of the working page.

According to a fourth aspect, an embodiment of the present disclosure further provides another apparatus for processing data, including a copy unit configured to copy a shared virtual memory page to which a first process requests access into off-chip memory of a computing node, and use the shared virtual memory page copied into the off-chip memory as a working page of the first process, where the shared virtual memory page is a virtual memory page in shared virtual memory of an application program to which the first process belongs, and the application program runs on the computing node; a query unit configured to, before the first process performs a write operation on the working page, query on-chip memory of the computing node for a backup page of the working page; and a backup unit configured to, when the query unit finds a backup page of the working page in the on-chip memory of the computing node, determine the found backup page as a backup page of the working page, where the backup page is used for backing up original data in the working page.

In a first possible implementation manner of the fourth aspect, the backup unit is further configured to, when the query unit finds no backup page of the working page in the on-chip memory of the computing node, create a backup page of the working page, and store the created backup page into the on-chip memory of the computing node.

With reference to the first possible implementation manner of the fourth aspect, in a second possible implementation manner, a quantity of shared virtual memory pages is N, where N is a positive integer greater than or equal to 1; and a quantity of working pages of the first process is M, where M is a positive integer greater than or equal to 1; and the apparatus for processing data further includes a determining unit configured to, before the backup unit stores the created backup page into the on-chip memory of the computing node, determine whether remaining space of the on-chip memory is less than a first threshold; and a trigger unit configured to, when the determining unit determines that the remaining space of the on-chip memory is less than the first threshold, trigger the first process to synchronously update modified content in the M working pages of the first process into the M shared virtual memory pages corresponding to the M working pages, and release space occupied by backup pages of the M working pages in the on-chip memory.

With reference to the first or second possible implementation manner of the fourth aspect, in a third possible implementation manner, the on-chip memory of the computing node stores a backup page information table, where the backup page information table includes metadata information of all backup pages in the on-chip memory, and metadata information of each backup page includes a page number and a version number of each backup page, and the page number and the version number of each backup page are respectively the same as a page number and a version number of a working page corresponding to each backup page; the query unit is configured to query the backup page information table for metadata information of which a page number and a version number are respectively the same as a page number and a version number of the working page; and the backup unit is configured to, when the query unit finds metadata information of which a page number and a version number are respectively the same as the page number and the version number of the working page, determine a backup page corresponding to the found metadata information as the backup page of the working page.

With reference to the first or second possible implementation manner of the fourth aspect, in a fourth possible implementation manner, the on-chip memory includes multiple independent storage scopes, all processes of the application program are divided into at least one process group, and processes of each process group share one storage scope in the multiple independent storage scopes, such that the storage scope is used as an on-chip common buffer of the process group, and each process group has one separate backup page information table; and the backup page information table of each process group includes metadata information of all backup pages of all processes in the process group, and metadata information of each backup page includes a page number and a version number of each backup page, and the page number and the version number of each backup page are respectively the same as a page number and a version number of a working page corresponding to each backup page; the query unit is configured to query a backup page information table of a process group in which the first process is located for metadata information of which a page number and a version number are respectively the same as a page number and a version number of the working page; and the backup unit is configured to, when the query unit finds metadata information of which a page number and a version number are respectively the same as the page number and the version number of the working page, determine a backup page corresponding to the found metadata information as the backup page of the working page.

According to a fifth aspect, an embodiment of the present disclosure provides a computer system, including a processor, a first storage, and an operating system kernel, where the processor is configured to run an application program, the processor includes a second storage inside, and a data access speed of the second storage is greater than a data access speed of the first storage; and the operating system kernel is configured to copy a shared virtual memory page to which a first process of the application program requests access into the first storage, and use the shared virtual memory page copied into the first storage as a working page of the first process; and before the first process performs a write operation on the working page, create a backup page of the working page, and store the created backup page into the second storage, so as to back up original data of the working page, where the shared virtual memory page is a virtual memory page in shared virtual memory of the application program.

In a first possible implementation manner of the fifth aspect, a quantity of shared virtual memory pages is N, where N is a positive integer greater than or equal to 1; and a quantity of working pages of the first process is M, where M is a positive integer greater than or equal to 1; and the operating system kernel is further configured to, before storing the created backup page into the second storage, determine whether remaining space of the second storage is less than a first threshold, and if the remaining space of the second storage is less than the first threshold, trigger the first process to synchronously update modified content in the M working pages of the first process into the M shared virtual memory pages corresponding to the M working pages, and release space occupied by backup pages of the M working pages in the second storage.

With reference to the fifth aspect or the first possible implementation manner of the fifth aspect, in a second possible implementation manner, the second storage stores a backup page information table, where the backup page information table includes metadata information of all backup pages in the second storage, and metadata information of each backup page includes a page number and a version number of each backup page, and the page number and the version number of each backup page are respectively the same as a page number and a version number of a working page corresponding to each backup page; and the operating system kernel is configured to, before the first process performs a write operation on the working page for the first time, query the backup page information table for metadata information of which a page number and a version number are respectively the same as a page number and a version number of the working page, and if no metadata information of which a page number and a version number are respectively the same as the page number and the version number of the working page is found, create the backup page of the working page, and store the created backup page into the second storage, so as to back up the original data of the working page; and if metadata information of which a page number and a version number are respectively the same as the page number and the version number of the working page is found, determine a backup page corresponding to the found metadata information as the backup page of the working page.

It can be known from the foregoing technical solutions that, in the embodiments of the present disclosure, data content in a shared virtual page is copied into a working page in off-chip memory, on which a process performs read and write operations, and using programmable on-chip memory of a computing node, before a write operation is performed on the working page, page data is backed up in the on-chip memory, so as to ensure data consistency when multiple processes perform an operation on the shared virtual memory page. Because a backup page is stored in the on-chip memory, the backup page does not contend with the working page for space of a cache and more working pages can be stored in the cache, and access speeds of the cache and the on-chip memory both are relatively fast (5 to 10 times faster than access to the off-chip memory), such that running performance of a program can be improved.

Further, content of the shared virtual memory page is updated in time using an active comparison mechanism, and it is ensured that when a comparison operation is performed, the working page is basically still located in the cache, such that access to the off-chip memory is not required, and therefore a speed of data update is very fast.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the present disclosure clearer, the following clearly and describes the technical solutions of the present disclosure with reference to the accompanying drawings in the embodiments of the present disclosure. The following described embodiments are a part of the embodiments of the present disclosure. Based on the embodiments of the present disclosure, persons of ordinary skill in the art can obtain other embodiments that can resolve the technical problem of the present disclosure and implement the technical effect of the present disclosure by equivalently altering some or all the technical features even without creative efforts. The embodiments obtained by means of alteration do not depart from the scope disclosed in the present disclosure.

To make persons of ordinary skill in the art better understand the technical solutions provided in the embodiments of the present disclosure, an application scenario of the technical solutions in the embodiments of the present disclosure is first briefly introduced. The technical solutions provided in the embodiments of the present disclosure may be applied to a computing node, and software cache coherence is implemented by improving an existing Twin/Diff mechanism, where the computing node refers to a computer or chip that has a processor and a storage, is provided with an operating system, and supports on-chip memory, such as an SCC of Intel®, the processor of the computing node includes one or more processor cores, and the processor cores all maintain their caches in a manner in which memory is shared. In another application scenario, as long as software cache coherence is involved, the technical solutions in the embodiments of the present disclosure are applicable thereto. In an implementation process, a product form of the technical solutions in the embodiments of the present disclosure includes, but is not limited to an operating system, an LIB library, an application system using a third-party LIB library, and a computer provided with an operating system and/or an LIB library.

Figure 1:
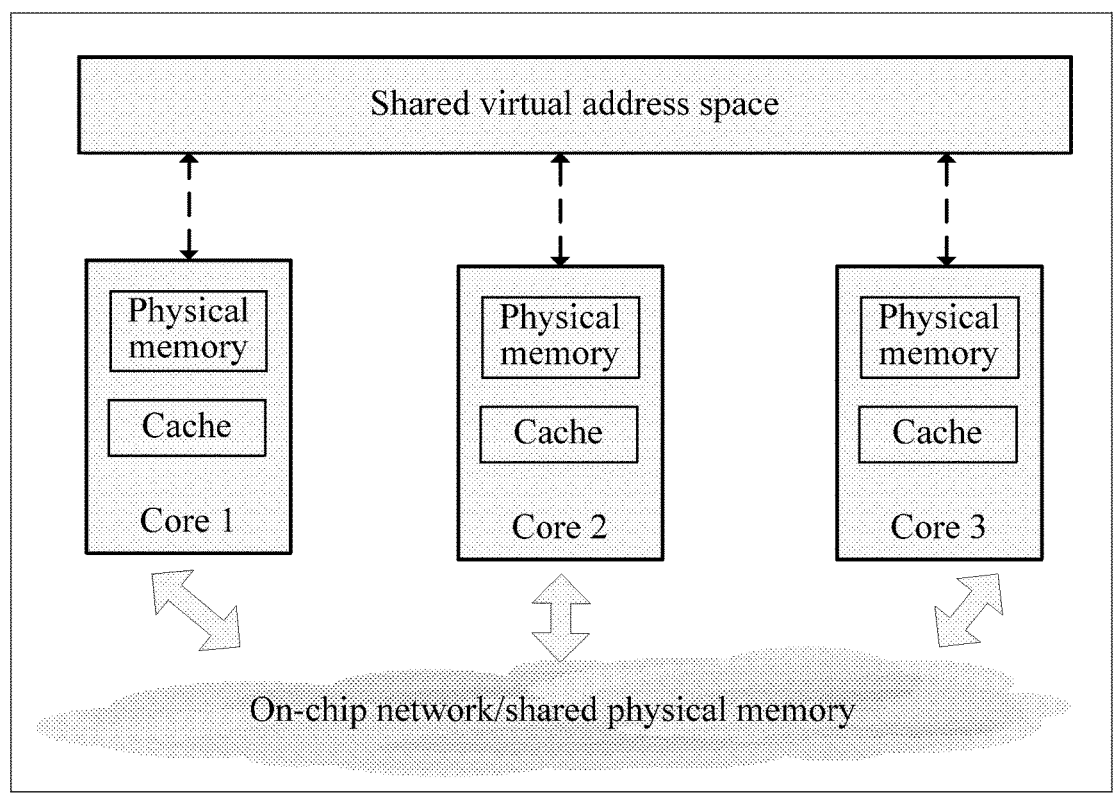
FIG. 1 is a schematic diagram of a distributed shared memory model according to an embodiment of the present disclosure.
Figure 2:
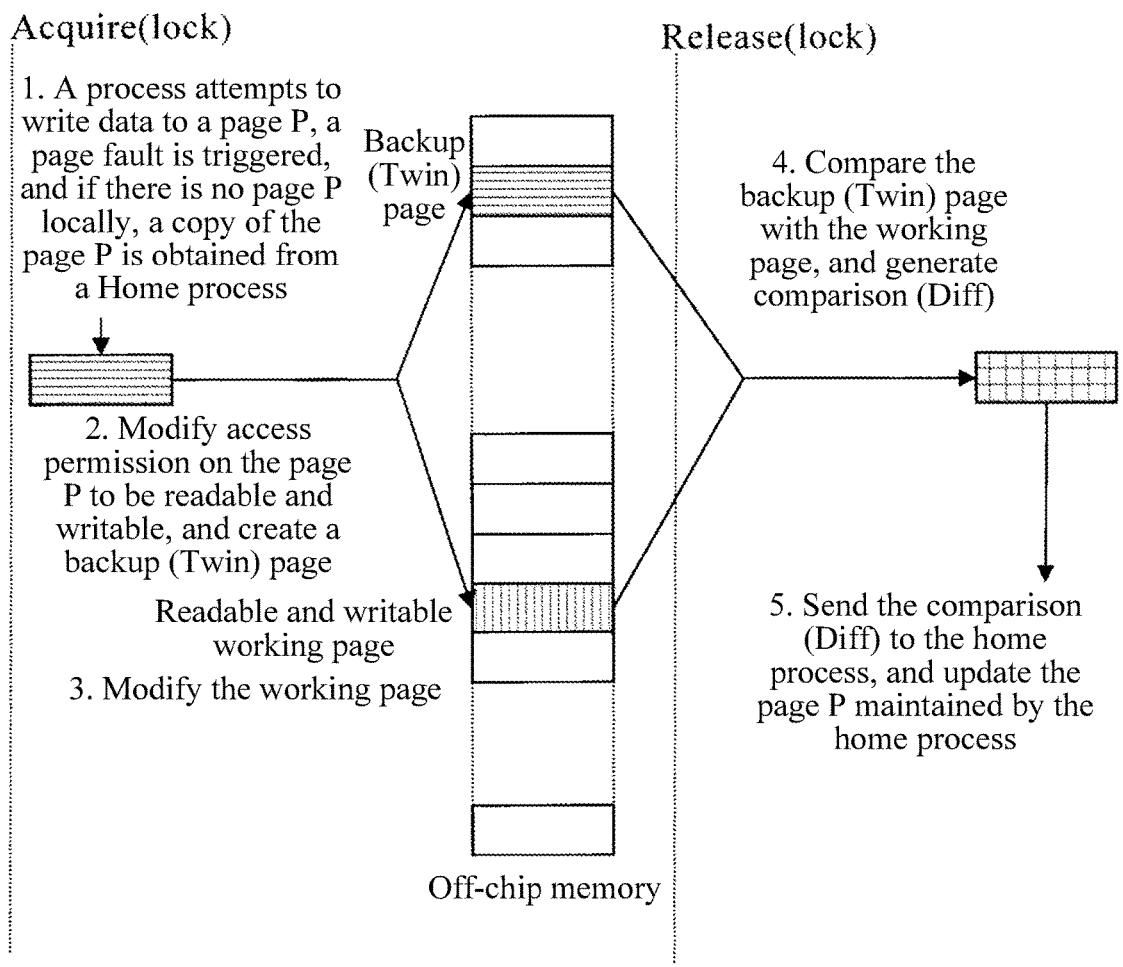
FIG. 2 is a schematic diagram of a Twin/Diff procedure according to an embodiment of the present disclosure.

Further, to make persons of ordinary skill in the art better understand the technical solutions provided in the embodiments of the present disclosure, the Twin/Diff mechanism in the prior art is briefly introduced. Referring to FIG. 2, in the prior art, a procedure of the Twin/Diff mechanism is as follows.

Step 1: A process A obtains a lock lock1 by executing Acquire(lock1), and enters a scope 1.

Step 2: If the process A reads a shared virtual memory page P, and the shared virtual memory page P has no mapping in an address space of the process A, an operating system triggers a page fault, obtains, in a page fault processing function of the process A, data of the shared virtual memory page P from a home process of the shared virtual memory page P, applies for a physical memory page from off-chip memory to store the data, then establishes, in the address space of the process A, a mapping relationship between the shared virtual memory page P and the physical memory page, and modifies access permission of the process A on the shared virtual memory page P to be read-only; and the procedure goes to step 5.

Step 3: If the process A writes data to a shared virtual memory page P, and the shared virtual memory page P has no mapping in an address space of the process A, an operating system triggers a page fault, obtains, in a page fault processing function of the process A, data of the shared virtual memory page P from a home process of the shared virtual memory page P, applies for a physical memory page from off-chip memory to store the data, where the physical memory page is a working page of the process A, then establishes, in the address space of the process A, a mapping relationship between the shared virtual memory page P and the physical memory page, stores a Twin page for the shared virtual memory page P into the off-chip memory (maintains a copy of the same data), and modifies access permission of the process A on the shared virtual memory page P to be readable and writable; and the procedure goes to step 5.

Step 4: If the process A writes data to a shared virtual memory page P, the shared virtual memory page P has a mapping in an address space of the process A, and access permission of the process A on the shared virtual memory page P is read-only, an operating system triggers a page fault, in a page fault processing function of the process A, backs up original data in the shared virtual memory page P into off-chip memory using a backup page (Twin page), and modifies the access permission of the process A on the shared virtual memory page P to be readable and writable; and the procedure goes to step 5.

Step 5: The process A normally reads/writes data to the shared virtual memory page P.

Step 6: The process A triggers a comparison (Diff) operation by executing Release(lock1) to compare data content of the Twin page and that of the physical memory page (working page) to which the shared virtual memory page P is mapped, generate a Diff file, and update the data of the shared virtual memory page P maintained by the home process. After the Diff operation is completed, the process A releases the lock lock1, and leaves the scope 1.

Figure 3:
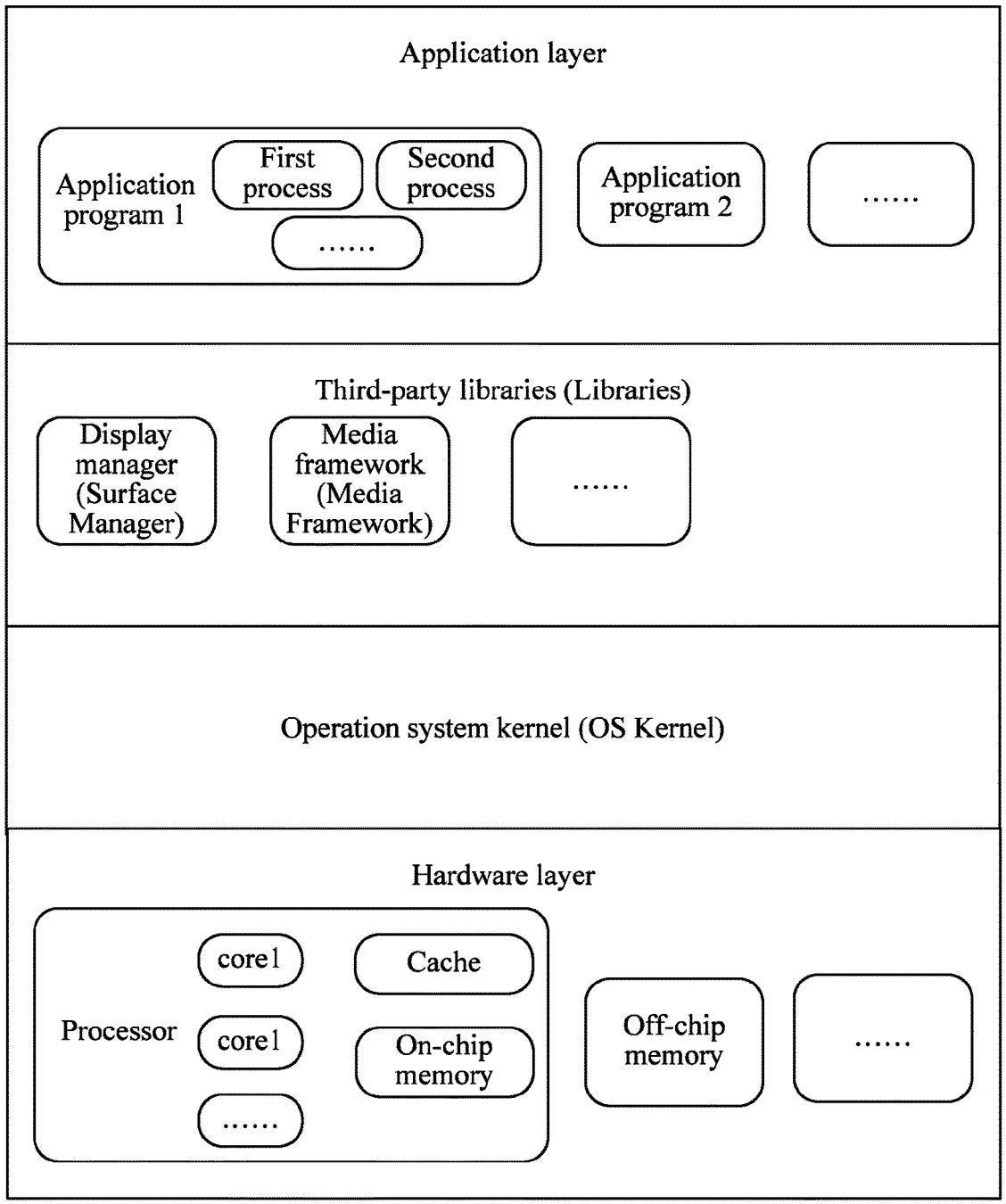
FIG. 3 is a diagram of a logical architecture of a computing node according to an embodiment of the present disclosure.

To solve a problem in the existing Twin/Diff mechanism, the present disclosure proposes a method for processing data. First, a logical structure of a computing node used in a method for processing data provided in an embodiment of the present disclosure is introduced using FIG. 3 as an example, where the computing node may be a large-scale computing device, such as a multi-core chip integrated with an operating system kernel, a general-purpose computer, a cloud computer, a computing node in a distributed system, or a server, or may be a mobile terminal such as a mobile phone or a table computer. As shown in FIG. 3, a hardware layer of the computing node includes one or more processors (one processor may include multiple cores), for example, a central processing unit (CPU) and a graphics processor unit (GPU), and may further include off-chip storage (off-chip memory, a hard disk, or the like), an input/output device, a network interface, and the like, where memory of a processor is integrated with a cache and on-chip memory, and each core of the processor is also integrated with a cache; an operating system kernel (for example, Linux Kernel) and third-party libraries (for example, a display manager (Surface Manager) and a media framework) run above the hardware layer, where the third-party libraries may be loaded by the operating system into memory for execution; besides, the computing node may further include an application layer, where the application layer includes one or more application programs, one application program includes one or more processes, one process includes one or more threads, and the application program runs on the computing node and controls the hardware layer by using the operating system kernel to complete a corresponding function.

As shown in FIG. 3, the method for processing data provided in this embodiment of the present disclosure may be implemented by a layer with the third-party libraries and the application layer, or may be implemented by the operating system or a hypervisor layer. An application program accesses a shared virtual memory page by executing a function such as acquire, release, or the like, and triggers the hardware layer to execute a corresponding operation, so as to ensure data consistency when multiple processes or threads running on the computing node perform an operation on the shared virtual memory page.

Figure 4:
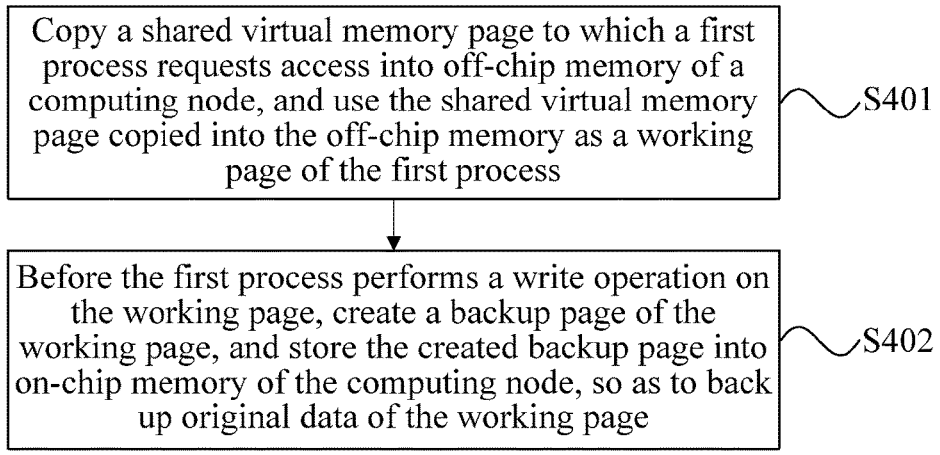
FIG. 4 is a flowchart of a method for processing data according to an embodiment of the present disclosure.

As shown in FIG. 4, a method for processing data provided in an embodiment of the present disclosure includes the following steps.

S401: Copy a shared virtual memory page to which a first process requests access into off-chip memory of a computing node, and use the shared virtual memory page copied into the off-chip memory as a working page of the first process, where the shared virtual memory page is a virtual memory page in shared virtual memory of an application program to which the first process belongs, and the application program runs on the computing node.

Figure 5:
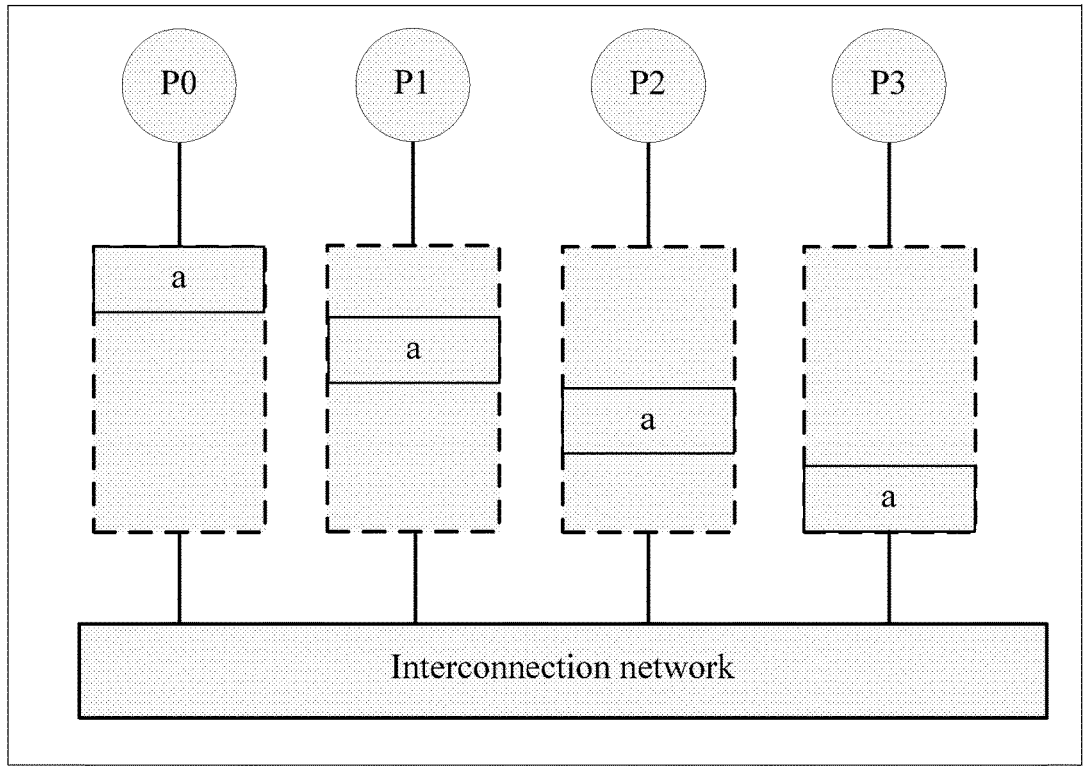
FIG. 5 is a schematic diagram of a shared virtual memory space according to an embodiment of the present disclosure.

FIG. 5 is a schematic diagram of a shared virtual memory space of an application program 1 to which a first process P0 belongs. It is assumed that the application program 1 includes 4 processes: the first process P0 and second processes P1 to P3, which separately run on different processor cores of a computing node, and have uniform shared virtual memory for storing shared data. Each process separately maintains one shared scope in the shared virtual memory, and each shared scope includes one or more virtual memory pages. As shown in FIG. 5, in the shared virtual memory space, a first scope is mapped to private physical memory of P0, a second scope is mapped to private physical memory of P1, a third scope is mapped to private physical memory of P2, and a fourth scope is mapped to private physical memory of P3. Each process sees the complete shared virtual memory from a user plane, and does not perceive that shared data included in a virtual memory page in the shared virtual memory is actually in a private physical memory space maintained by another process. Each process may perform any data operation on the shared virtual memory, and a bottom layer of the computing node performs data synchronization between the processes using an on-chip network, an interconnection network, or shared physical memory, which can be accessed by all the processes, of a system. A second process described in this embodiment of the present disclosure refers to one in all other processes in the application program 1 except the first process, and is merely used for differentiation from the first process, and not used for referring in particular to a process.

In the embodiments of the present disclosure, the shared virtual memory page to which the first process requests access refers to a shared virtual memory page that the first process requests to read or write data to. If the first process P0 reads or writes data to a shared virtual memory page P, and the shared virtual memory page P has no mapping in a physical address space of the first process P0, an operating system triggers a page fault, obtains, in a page fault processing function of the first process P0, data of the shared virtual memory page P from a home process of P, applies for a physical memory page from off-chip memory of the computing node as a working page of the first process, establishes a mapping relationship between the shared virtual memory page P and the physical memory page, and writes the data of the shared virtual memory page P to the physical memory page, where the working page is a page on which the first process can perform read and write operations, and when the first process reads or writes data to a shared virtual page, the first process actually reads or writes data to a working page corresponding to the shared virtual page, thereby ensuring that no conflict is caused when multiple processes read or write data to one same shared virtual page. In addition, it should be noted that the first process may copy multiple shared virtual pages into the off-chip memory. Also there are multiple working pages of the first process, and generally, quantities of the two are the same, that is, each working page corresponds to one shared virtual memory page. It may be understood that, in another implementation manner, a shared virtual memory page may be not in a one-to-one correspondence to a working page, where data of one shared virtual memory page may be stored in multiple working pages, or data of multiple virtual memory pages may be stored in one working page.

It should be noted that, in an embodiment, different scopes in the shared virtual memory of the application program 1 are separately maintained by different processes or threads (that is, the case described in FIG. 5), and in this case, the first process may obtain the data of the shared virtual memory page P from the home process of the shared virtual memory page P. In another embodiment, if the entire shared virtual memory space of the application program 1 is jointly maintained by all processes of the application program 1, when reading the shared virtual memory page P, the first process does not need to obtain the data of the page P from the home process of P, but can directly read the data of the shared virtual memory page P. It should be further noted that the off-chip memory described in this embodiment of the present disclosure refers to a storage outside a CPU of the computing node, for example, memory or a hard disk of the computing node.

S402: Before the first process performs a write operation on the working page, create a backup page of the working page, and store the created backup page into on-chip memory of the computing node, so as to back up original data of the working page.

The backup page of the working page may be created when the first process writes data to the working page for the first time, so as to back up the original data of the working page, where it may be understood that the original data of the working page is data stored before the process performs a read or write operation on the working page; and after the backup page of the working page is successfully created in the on-chip memory, the operating system jumps out of the page fault processing function of the first process, and the first process re-executes an instruction from a place at which the page fault occurs, and further performs a read or write operation on the data in the working page. Because a copy of the original data of the working page is maintained in the on-chip memory, no matter how the first process modifies the working page later, which part of content in the working page is modified by the process can be determined by comparing current data content of the working page with original data content in the backup page of the working page, and further the modified content can be synchronously updated into the shared virtual memory page corresponding to the working page.

The on-chip memory described in this embodiment of the present disclosure may be a storage in the CPU of the computing node, such as programmable on-chip memory (for example, a programmable on-chip memory message passing buffer (MPB) provided by an Intel SCC many-core platform); and further, the on-chip memory may be another storage scope in the CPU of the computing node except a cache (for example, an L1 cache or an L2 cache), and if the CPU of the computing node has multiple cores, the cores may share the on-chip memory. The on-chip memory does not have a large space, of which, however, access latency is similar to that of a second-level cache L2 cache of the CPU of the computing node, and is a good resource.

It should be noted that, before reading or writing data to the shared virtual memory page P, the first process generally obtains a lock lock1 by executing Acquire(lock1), so as to enter a scope 1 in which the page P is located in the shared virtual memory; and the first process may exit the scope 1 of the shared virtual memory by executing Release(lock1), and trigger a Diff operation to compare data content of the physical memory page (working page) to which the shared virtual memory page P is mapped and the backup page, and generate a log file Diff for recording a data content difference between the two, such that the home process of the shared virtual memory page P updates the data of the shared virtual memory page P. After the Diff operation is completed, the first process releases the lock lock1, and leaves the scope 1.

In a more specific implementation manner, each process of the application program 1 to which the first process belongs separately occupies one on-chip storage scope in the on-chip memory, so as to store a backup page of a working page of the process. In this case, before the creating of a backup page of the working page, the method further includes allocating in advance an on-chip storage scope of a specific size in the on-chip memory of the computing node to each process of the application program 1, where the size of the on-chip storage scope allocated to each process may be determined by persons skilled in the art according to a total capacity and an available capacity of the on-chip memory, or may be set according to an empirical value, and the size of the on-chip storage scope of each process may be the same or may be different.

Correspondingly, the storing of the created backup page into on-chip memory of the computing node includes storing the created backup page into an on-chip storage scope that is allocated in advance to the first process.

Finally, it should be noted that the technical solutions of the present disclosure are described in this embodiment of the present disclosure using the first process as an example, which should not be understood as a limitation to a solution execution body of the present disclosure, and persons skilled in the art may understand that a solution execution entity in this embodiment of the present disclosure may be a process or a thread. The execution entity is a thread or a process, and cannot represent both a thread and a process in a complete implementation method. That is, the method in the embodiments of the present disclosure may be implemented at a dimension corresponding to a thread, or may be implemented at a dimension corresponding to a process.

In this embodiment of the present disclosure, using the foregoing technical solutions, a shared virtual memory page that a process requests to read or write data to is first copied into off-chip memory of a computing node, the copy is used as a working page on which the process can perform read and write operations, and before the process performs a write operation on the working page, original data in the working page is backed up in the on-chip memory using on-chip memory of a CPU of the computing node, so as to ensure data consistency when multiple processes perform an operation on the shared virtual memory page. Because a backup page is stored in the on-chip memory, an access speed of the page can be ensured, and the backup page and the working page are stored separately, such that the backup page does not contend with the working page for space of a cache and more working pages can be stored in the cache, and therefore running performance of a program can be improved.

Figure 6:
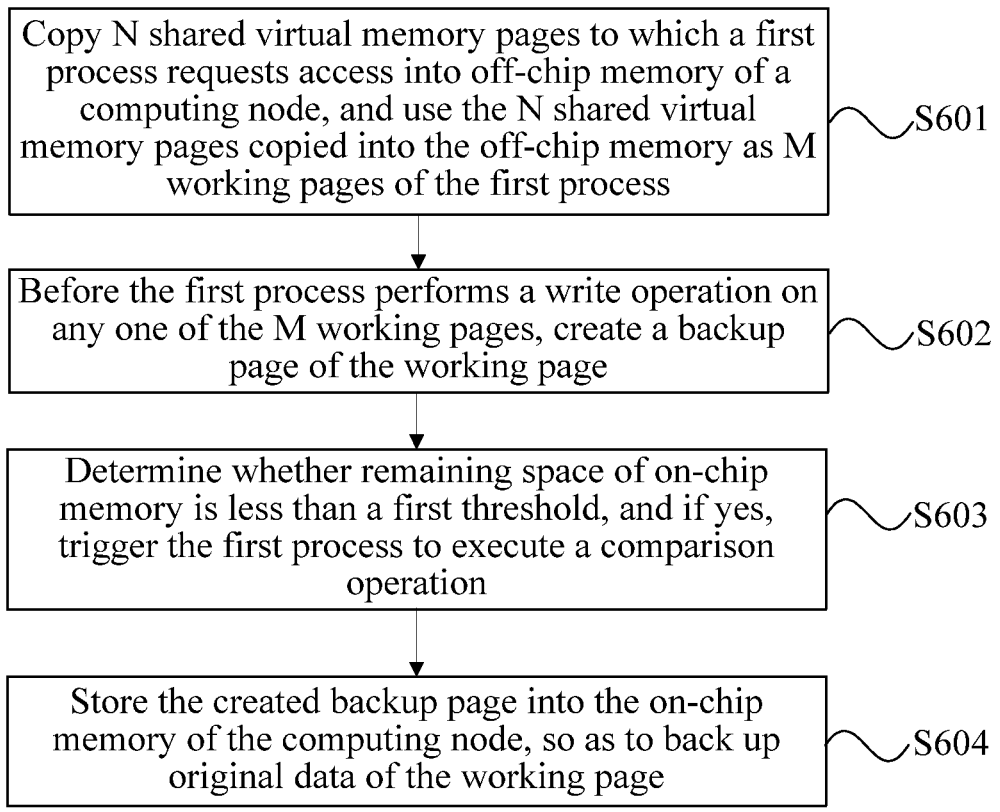
FIG. 6 is a flowchart of another method for processing data according to an embodiment of the present disclosure.

An embodiment of the present disclosure provides another method for processing data on a computing node. As shown in FIG. 6, the method includes the following steps.

S601: Copy N shared virtual memory pages to which a first process requests access into off-chip memory of a computing node, and use the N shared virtual memory pages copied into the off-chip memory as M working pages of the first process, where the shared virtual memory pages are virtual memory pages in shared virtual memory of an application program to which the first process belongs, and M and N both are positive integers greater than or equal to 1.

Generally, M=N, that is, each working page uniquely corresponds to one shared virtual memory page. It may be understood that, in another implementation manner, a shared virtual memory page may be not in a one-to-one correspondence to a working page, where data of one shared virtual memory page may be stored in multiple working pages, or data of multiple virtual memory pages may be stored in one working page.

S602: Before the first process performs a write operation on any one of the M working pages, create a backup page of the working page.

S603: Determine whether remaining space of on-chip memory of the computing node is less than a first threshold, and if the remaining space of on-chip memory of the computing node is less than the first threshold, trigger the first process to synchronously update modified content in the M working pages of the first process into the shared virtual memory pages corresponding to the M working pages, and release space occupied by backup pages of the M working pages in the on-chip memory.

A process wherein the first process synchronously updates the modified content in the M working pages of the first process into the shared virtual memory pages corresponding to the working pages, and releases the space occupied by the backup pages of the working pages in the on-chip memory is referred to as "the first process executes a comparison (Diff) operation". In an embodiment, executing, by a process A, a comparison operation includes comparing each working page in all working pages of the process A with a backup page of the working page in on-chip memory, to obtain a data content difference between the two, that is, finding a part modified by the process A, of which data is changed, and generating a log file for recording the data content difference between the two, and updating, according to the log file, content modified by the process A in each working page into a shared virtual page corresponding to the working page. It should be noted that the operation of updating the shared virtual page according to the log file may be completed by the process A, or may be completed by a home process of the updated shared virtual page, which needs to be determined according to a specific application scenario.

After a backup page of a working page is created, if the remaining space of the on-chip memory is less than the first threshold, data of the working page cannot be backed up in the on-chip memory, and therefore the first process is triggered to execute a comparison operation, thereby releasing space of the on-chip memory, and refreshing data of a corresponding page in a shared virtual memory space; it may be understood that the first threshold may be set by persons skilled in the art by comprehensively considering factors such as a total capacity and an available storage space of the on-chip memory, or may be set according to an empirical value, which is not particularly limited herein.

It should be noted that, in this embodiment of the present disclosure, a working page is backed up using space of the on-chip memory of the computing node; in a different application example, the space of the on-chip memory may be divided in a different manner, and correspondingly, in a different on-chip memory space division manner, a time and manner for triggering the first process to execute a comparison operation are different accordingly.

In a first possible implementation manner, each process of the application program has a separate on-chip storage scope in the on-chip memory; that is, an on-chip storage scope of a specific size in the on-chip memory of the computing node is allocated in advance to each process of the application program, where the size of the on-chip storage scope that is allocated in the on-chip memory to each process may be the same or may be different. In this case, the determining step in step S603 includes determining whether remaining space of an on-chip storage scope of the first process is less than a size of a backup page created in step S602 or is less than a second threshold. Correspondingly, if it is determined that the remaining space of the on-chip storage scope of the first process is less than the size of the backup page or is less than the second threshold, the first process is triggered to execute a comparison operation.

In a second possible implementation manner, all processes of the application program share the entire on-chip memory or a local scope in the on-chip memory, that is, all processes on the computing node can store a backup page into the on-chip memory. In this case, the first threshold may be a size of a backup page created in step S602; that is, the determining step in step S603 includes determining whether the remaining space of the on-chip memory of the computing node is less than the size of the backup page created in step S602. Correspondingly, if it is determined that the remaining space of the on-chip memory of the computing node is less than the size of the backup page created in step S602, the first process is triggered to execute a comparison operation. Further, there are two policies for triggering a process to execute a comparison operation.

(1) Only the first process is triggered to execute a comparison operation, and another process of the application program is not affected.

(2) All the processes of the application program 1 to which the first process belongs are triggered to execute a comparison operation.

In a third possible implementation manner, the space of the on-chip memory of the computing node is not globally shared but locally shared, that is, only some processes can share a local scope in the on-chip memory. This on-chip memory division manner is that the entire space of the on-chip memory is divided into multiple mutually independent storage scopes, all the processes of the application program 1 to which the first process belongs are divided into one or more process groups, and processes in each process group share one in the multiple independent storage scopes, such that the storage scope is used as an on-chip common buffer of the process group; that is, the processes in each process group can access one same space of the on-chip memory, and different process groups access different spaces of the on-chip memory. For example, on-chip memory 1 can be accessed by a core 0 to a core 3, on-chip memory 2 can be accessed by a core 4 to a core 7, on-chip memory 3 can be accessed by a core 8 to a core 11, and on-chip memory 4 can be accessed by a core 12 to a core 15. All processes in a process group can store backup pages of working pages of the processes into a storage scope in the on-chip memory. In this on-chip memory division manner, storing the created backup page into the on-chip memory of the computing node includes storing the created backup page into an on-chip common buffer of a process group in which the first process is located; and correspondingly, the determining step in step S603 includes determining whether remaining space of the on-chip common buffer of the process group in which the first process is located is less than a size of a backup page created in step S602 or is less than a second threshold. Correspondingly, if it is determined that the remaining space of the on-chip common buffer of the process group in which the first process is located is less than the size of the backup page created in step S602 or is less than the second threshold, the backup page of the working page is unsuccessfully created, and further a process is triggered to execute a comparison operation. Likewise, there are two policies for triggering a process to execute a comparison operation.

(1) Only the first process is triggered to execute a comparison operation, and another process in the process group in which the first process is located is not affected.

(2) Failure information is broadcast in the process group in which the first process is located, and all processes in the process group are triggered to execute a comparison operation.

It should be noted that a procedure of executing a comparison operation by a process is the same as that described above, and a procedure of executing a comparison operation by another process is similar to the procedure of executing a comparison operation by the first process, and details are not described herein again; it should be further noted that the second threshold may be set according to factors such as a total capacity and an available storage space of the on-chip memory, or may be set according to an empirical value, which is not particularly limited herein.

In this embodiment of the present disclosure, assuming that the space of the on-chip memory of the computing node is smaller than space of an L2 cache, that the space of the on-chip memory cannot contain next backup page is used as a trigger condition for the comparison operation; if the space of the on-chip memory is larger than space of an L2 cache, that space occupied by a backup page is equal to a size of the L2 cache may be used as a trigger condition for the comparison operation. In addition, it is also feasible to determine using another trigger condition. If the space of the on-chip memory of the computing node is relatively large, it may also be considered that a working page is stored in the space of the on-chip memory.

In this embodiment of the present disclosure, using the foregoing technical solutions, a shared virtual memory page that a process requests to read or write data to is first copied into off-chip memory of a computing node, the copy is used as a working page on which the process can perform read and write operations, and before the process performs a write operation on the working page, original data in the working page is backed up in the on-chip memory using on-chip memory of a CPU of the computing node, so as to ensure data consistency when multiple processes perform an operation on the shared virtual memory page. Because a backup page is stored in the on-chip memory, an access speed of the page can be ensured, and the backup page and the working page are stored separately, such that the backup page does not contend with the working page for space of a cache and more working pages can be stored in the cache, and therefore running performance of a program can be improved. Further, content of the shared virtual memory page is updated in time by performing an actively triggered comparison operation, and it is ensured that when the comparison operation is performed, the working page is basically still located in the cache, such that access to the off-chip memory is not required, and therefore a speed of the comparison operation is very fast.

S604: Store the created backup page into the on-chip memory of the computing node, so as to back up original data of the working page.

For implementation details of steps S601, S602, and S604, reference may be made to steps S401 and S402 in the foregoing method embodiment, which are not described herein again.

Figures 7, 8:
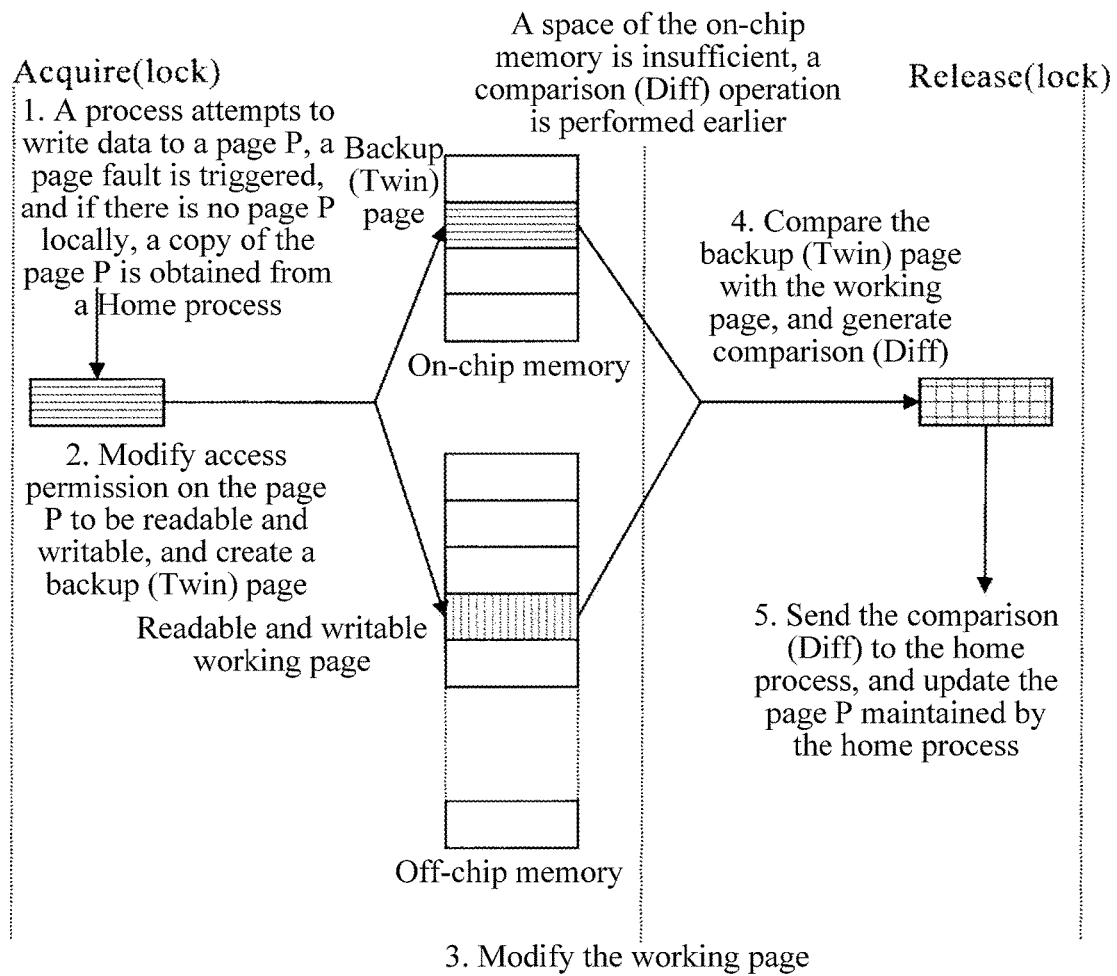
FIG. 7 is a schematic diagram of a method for processing data according to an embodiment of the present disclosure.
FIG. 8 is a schematic diagram of metadata information of a backup page according to an embodiment of the present disclosure.

Based on the foregoing method embodiment, the following describes the technical solutions of the present disclosure using a specific application example. It is assumed that each process of the application program separately maintains one scope in the shared virtual memory, that is, virtual memory pages in different scopes have different home processes. As shown in FIG. 7, a method procedure based on this scenario is as follows.

(1) A first process A obtains a lock lock1 by executing Acquire(lock1), and enters a scope 1.

(2) If the first process A reads a shared virtual memory page P, and the shared virtual memory page P has no mapping in an address space of the process A, an operating system triggers a page fault, obtains, in a page fault processing function of the process A, data of the shared virtual memory page P from a home process of the shared virtual memory page P, applies for a physical memory page from off-chip memory to store the data, then establishes, in the address space of the process A, a mapping relationship between the shared virtual memory page P and the physical memory page, uses the physical memory page as a working page of the process A, and modifies access permission of the process A on the shared virtual memory page P to be read-only; and the procedure goes to (5).

(3) If the process A writes data to a shared virtual memory page P, and the shared virtual memory page P has no mapping in an address space of the process A, an operating system triggers a page fault, obtains, in a page fault processing function of the process A, data of the shared virtual memory page P from a home process of the shared virtual memory page P, applies for a physical memory page from off-chip memory to store the data, then establishes, in the address space of the process A, a mapping relationship between the shared virtual memory page P and the physical memory page, uses the physical memory page as a working page of the process A, creates, in programmable on-chip memory, a Twin page for the working page (maintains a copy of the same data, where in this process, if the Twin page is unsuccessfully created, an active Diff operation is triggered), and modifies access permission of the process A on the shared virtual memory page P to be readable and writable; and the procedure goes to (5).

(4) If the process A writes data to a shared virtual memory page P, the shared virtual memory page P has a mapping in an address space of the process A, and access permission of the process A on the shared virtual memory page P is read-only, an operating system triggers a page fault, in a page fault processing function of the process A, stores a Twin page for the shared virtual memory page P into programmable on-chip memory (maintains a copy of same data, where in this process, an active Diff operation may be triggered), and modifies the access permission of the process A on the shared virtual memory page P to be readable and writable; and the procedure goes to (5).

(5) The process A normally reads/writes data to the shared virtual memory page P.

(6) The process A triggers the Diff operation by executing Release(lock1) to compare data content of a physical memory page (working page) to which a shared virtual memory page on which the Diff operation is not performed yet is mapped and a Twin page, generate a log file Diff, and update data of shared virtual memory page maintained by home processes corresponding to the shared virtual memory pages. After the Diff operation is completed, the process A releases the lock lock1, and leaves the scope 1.

It should be noted that a manner for processing another shared virtual memory page is the same as that of the shared virtual memory page P.

Further, because the on-chip memory of the computing node is generally globally shared, that is, it can be accessed by all cores of the computing node, this embodiment of the present disclosure proposes a solution of a backup page resource pool.

Because the programmable on-chip memory can be accessed by all the cores, a backup page stored in the programmable on-chip memory is also a shared resource, and can be shared by different cores. For example, multiple processes (on a same core or different cores) all perform a write operation in a time period at different positions of a page x, and according to the solutions in the foregoing embodiment, each process needs a separate backup page, which wastes a memory space. Because the on-chip memory can be accessed by all the cores, for one same version of one same shared virtual memory page of different processes, only one backup page needs to be stored in the space of the on-chip memory. Based on this, the method for processing data in this embodiment of the present disclosure can be further optimized. Before the step of creating a backup page of the working page, the on-chip memory of the computing node may be first queried for the backup page of the working page, and if the backup page of the working page is found, the step of creating a backup page in S602 and steps S603 and S604 can be omitted; and only if no backup page of the working page is found, the step of creating a backup page in step S602 and steps S603 and S604 are performed.

In an implementation manner, metadata information of backup pages in the on-chip memory may be recorded using a data structure, such as a backup page queue or a backup page information table, where metadata information of a backup page includes a page number Twin Page identifier (Id) and version number Twin Page Version of the backup page. In a more optimal embodiment, as shown in FIG. 8, metadata information of a backup page may include Twin Page Id, Twin Page Version, Twin Page Usage, and Twin Page Address. Meanings of the fields are as follows.

Twin Page Id: A page number of a shared virtual memory page to which a working page corresponding to a backup page is mapped, where in different processes, page numbers of one same shared virtual memory page are the same.

Twin Page Version: A version number of the backup page, where in different processes, version numbers of backup pages corresponding to one same shared virtual memory page may be different.

It should be noted that a version number of a backup page is the same as a version number of a working page corresponding to the backup page, and the version number of the working page is a version number of a shared virtual memory page corresponding to the working page when a process creates the working page. When a process creates a working page, that is, copies a shared virtual memory page into the off-chip memory of the computing node as a working page of the process, a version number of the working page is a version number of the copied shared virtual memory page; generally, an initial value of a version number of a shared virtual memory page is 1, different processes all may perform read and write operations on data in the shared virtual memory page later, and each time a process updates content in the shared virtual memory page, the version number of the shared virtual memory page increases. Therefore, in different processes, version numbers of working pages corresponding to one same shared virtual memory page may be different, further causing that version numbers of backup pages corresponding to the shared virtual memory page are also different.

Twin Page Usage: Usage of the backup page, which records a quantity of processes that currently use the backup page of the version.

Twin Page Address: An address of the backup page in programmable on-chip memory, where a process may access the backup page of the corresponding version according to the address.

In this case, the following manner may be used to query the on-chip memory of the computing node for a backup page of a working page. Before a backup page of a working page is created, a backup page information table for recording metadata information of backup pages in a backup page resource pool is queried according to a page number and a version number of the working page, for metadata information of which a page number and a version number are respectively the same as the page number and the version number of the working page.

Correspondingly, in step S602, the step of creating a backup page includes, if no metadata information of which a page number and a version number are respectively the same as the page number and the version number of the working page is found in the backup page information table, creating the backup page of the working page; and then steps S603 and S604 are performed. Further, if metadata information of which a page number and a version number are respectively the same as the page number and the version number of the working page is found, a backup page corresponding to the found metadata information is determined as the backup page of the working page, and the step of creating a backup page in S602 and steps S603 and S604 are omitted.

Further, after the backup page of the working page is created, the page number and the version number of the working page may be further recorded in the backup page information table respectively as a page number and a version number of the created backup page.

The following describes the foregoing solution using a specific example.

(1) Initially, a version number of a shared virtual memory page x in a Home process is 1.

(2) Sometime, a process A and a process B respectively perform Acquire(lock1) and Acquire(lock2) operations, obtain a copy of the shared virtual memory page x from the Home process, and separately perform a write operation. Assuming that the process A writes first, because no backup page x that corresponds to the shared virtual memory page x and has a version number 1 is found in a backup page information table, the process A creates a backup page x with the version number 1 in on-chip memory, and sets Twin Page Usage of the page x to be 1. When the process B writes data to the shared virtual memory page x, because the backup page x with the version number 1 can be found in the backup page information table, the process B does not need to create the same backup page x, and only needs to modify Twin Page Usage of the backup page x to be 2.

(3) Some time later, the process A triggers a Diff operation by performing a Release operation or performs the foregoing active Diff operation, to update the shared virtual memory page x of the Home process, increases the version number of the shared virtual memory page x of the Home process to 2, and modifies Twin Page Usage of the backup page x in the backup page information table to 1.

(4) A process C performs an Acquire(lock3) operation, obtains a copy of the shared virtual memory page x from the Home process, and performs a write operation. A version number of the copy, obtained by the process C, of the shared virtual memory page x is 2, but the version number of the backup page x that can be found in the backup page information table is 1, and the two do not match; therefore, the process C creates, in the on-chip memory, a backup page x with the version number 2, and sets Twin Page Usage of the backup page x with the version number 2 to be 1.

Further, in another embodiment, the space of the on-chip memory of the computing node may be not globally shared but locally shared, that is, the entire space of the on-chip memory is divided into multiple mutually independent storage scopes; and correspondingly, all the processes of the application program to which the first process belongs are divided into at least one process group, processes in each process group share one storage scope in the multiple independent storage scopes, such that the storage scope is used as an on-chip common buffer of the process group, each process group maintains a separate backup page information table, and the backup page information table of each process group includes metadata information of all backup pages of all processes in the process group. Definition of metadata information of a backup page is described above, and is not described herein again. In this case in which the on-chip memory is locally shared, the querying of the on-chip memory of the computing node for a backup page of a working page includes querying, according to a page number and a version number of the working page, a backup page information table of a process group in which the first process is located for metadata information of which a page number and a version number are respectively the same as the page number and the version number of the working page.

Correspondingly, in step S602, the step of creating a backup page includes, if no metadata information of which a page number and a version number are respectively the same as the page number and the version number of the working page is found in the backup page information table of the process group in which the first process is located, creating the backup page of the working page; and then steps S603 and S604 are performed. If metadata information of which a page number and a version number are respectively the same as the page number and the version number of the working page is found, a backup page corresponding to the found metadata information is determined as the backup page of the working page, and the step of creating a backup page in S602 and steps S603 and S604 are omitted.

Further, after the backup page of the working page is created, the page number and the version number of the working page may be recorded in the backup page information table of the process group in which the first process is located respectively as a page number and a version number of the created backup page.

In the optimized solution that is based on backup page sharing and proposed in this embodiment of the present disclosure, space, occupied by a backup page, of on-chip memory can be further reduced based on the foregoing method embodiment, storing a system resource.

Figure 9:
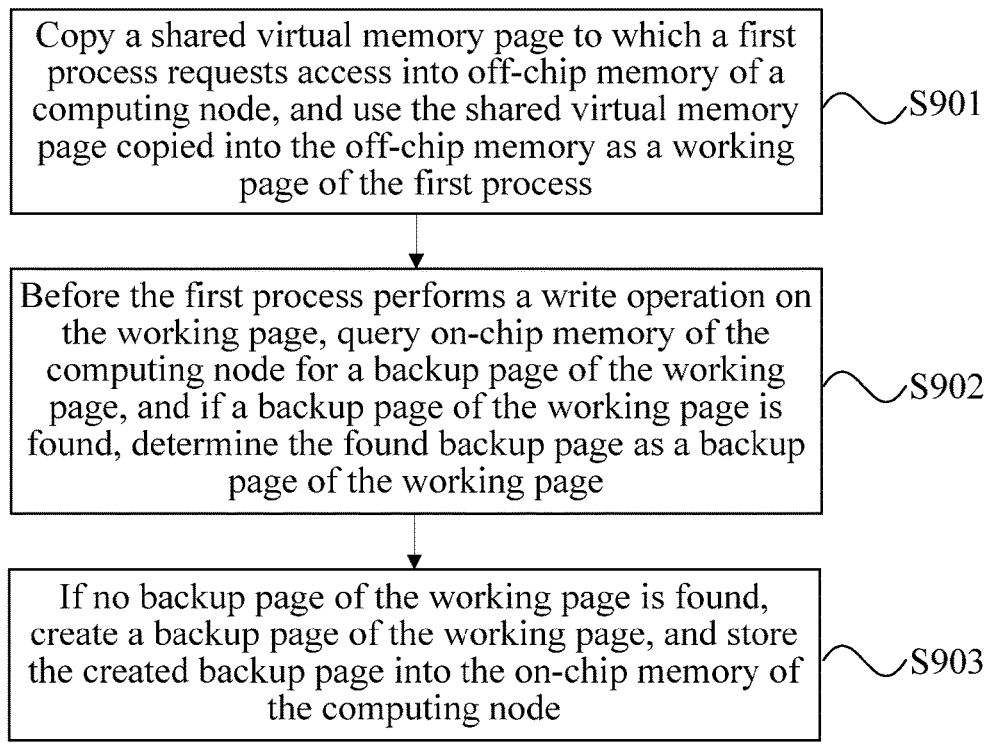
FIG. 9 is a flowchart of another method for processing data according to an embodiment of the present disclosure.

As shown in FIG. 9, an embodiment of the present disclosure provides another method for processing data, including the following steps.

S901: Copy a shared virtual memory page to which a first process requests access into off-chip memory of a computing node, and use the shared virtual memory page copied into the off-chip memory as a working page of the first process, where the shared virtual memory page is a virtual memory page in shared virtual memory of an application program to which the first process belongs, and the application program runs on the computing node.

S902: Before the first process performs a write operation on the working page, query on-chip memory of the computing node for a backup page of the working page, and if a backup page of the working page is found, determine the found backup page as a backup page of the working page, where the backup page stores original data in the working page.

Optionally, the method for processing data may further include the following step.

S903: If no backup page of the working page is found, create a backup page of the working page, and store the created backup page into the on-chip memory of the computing node, where the backup page is used for backing up original data in the working page.

Further, if a quantity of shared virtual memory pages to which the first process requests access is N; and a quantity of working pages of the first process is M, the method for processing data further includes, before the storing of the created backup page into the on-chip memory of the computing node, determining whether remaining space of the on-chip memory is less than a first threshold, and if the remaining space of the on-chip memory is less than the first threshold, triggering the first process to synchronously update modified content in the M working pages of the first process into the M shared virtual memory pages corresponding to the M working pages, and release space occupied by backup pages of the M working pages in the on-chip memory; or if the remaining space of the on-chip memory is not less than the first threshold, performing the step of storing the created backup page into the on-chip memory of the computing node in S903.

In an implementation manner, metadata information of backup pages in the on-chip memory may be recorded using a data structure stored in the on-chip memory, such as a backup page queue or a backup page information table, where definition of metadata information of a backup page is described above, and is not described herein again.

In this case, the following manner may be used for a backup page of a working page. Before a backup page of a working page is created, a backup page information table for recording metadata information of backup pages in a backup page resource pool is queried according to a page number and a version number of the working page, for metadata information of which a page number and a version number are respectively the same as the page number and the version number of the working page. Correspondingly, if metadata information of which a page number and a version number are respectively the same as the page number and the version number of the working page is found, a backup page corresponding to the found metadata information is determined as the backup page of the working page; or if no metadata information of which a page number and a version number are respectively the same as the page number and the version number of the working page is found, the backup page of the working page is created, and the created backup page is stored in the on-chip memory of the computing node.

Further, after the backup page of the working page is created, the page number and the version number of the working page may be further recorded in the backup page information table respectively as a page number and a version number of the created backup page.

Further, in another embodiment, the space of the on-chip memory of the computing node may be not globally shared but locally shared, that is, the entire space of the on-chip memory is divided into multiple mutually independent storage scopes; and correspondingly, all processes of the application program to which the first process belongs are divided into at least one process group, processes in each process group share one storage scope in the multiple independent storage scopes, such that the storage scope is used as an on-chip common buffer of the process group, each process group maintains a separate backup page information table, and the backup page information table of each process group includes metadata information of all backup pages of all processes in the process group. Definition of metadata information of a backup page is described above, and is not described herein again. In this case in which the on-chip memory is locally shared, the querying of the on-chip memory of the computing node for a backup page of a working page includes querying, according to a page number and a version number of the working page, a backup page information table of a process group in which the first process is located for metadata information of which a page number and a version number are respectively the same as the page number and the version number of the working page.

Correspondingly, if metadata information of which a page number and a version number are respectively the same as the page number and the version number of the working page is found, a backup page corresponding to the found metadata information is directly used as the backup page of the working page. If no metadata information of which a page number and a version number are respectively the same as the page number and the version number of the working page is found, the backup page of the working page is created, and the created backup page is stored in the on-chip memory of the computing node.

Further, after the backup page of the working page is created, the page number and the version number of the working page may be recorded in the backup page information table of the process group in which the first process is located respectively as a page number and a version number of the created backup page.

In the method for processing data that is based on backup page sharing and proposed in this embodiment of the present disclosure, space, occupied by a backup page, of on-chip memory can be further reduced based on the foregoing method embodiment, storing a system resource.

Figure 10:
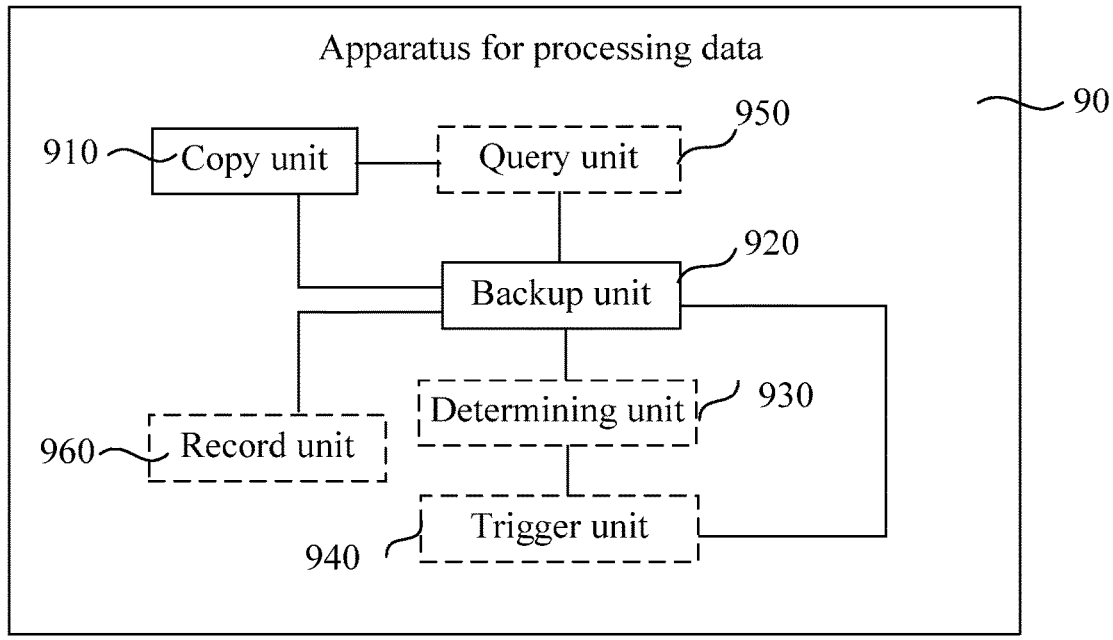
FIG. 10 is a schematic diagram of an apparatus for processing data according to an embodiment of the present disclosure.

An embodiment of the present disclosure further provides an apparatus for processing data, where the apparatus for processing data may be implemented by a library, or may be implemented by an operating system or a hypervisor layer. As shown in FIG. 10, the apparatus 90 for processing data includes a copy unit 910 and a backup unit 920. The copy unit 910 is configured to copy a shared virtual memory page to which a first process requests access into off-chip memory of a computing node, and use the shared virtual memory page copied into the off-chip memory as a working page of the first process, where the shared virtual memory page to which the first process requests access is one or more virtual memory pages that the first process requests to read or write data to in shared virtual memory of an application program to which the first process belongs.

If a first process P0 reads or writes data to a shared virtual memory page P, the apparatus for processing data triggers a page fault, and the copy unit 910 obtains data of the shared virtual memory page P in a page fault processing function of the first process P0, applies for a physical memory page from off-chip memory of a computing node as a working page of the first process, establishes a mapping relationship between the shared virtual memory page P and the physical memory page (working page), and writes the data of the shared virtual memory page P to the physical memory page, where the working page is a page on which the first process can perform read and write operations, and when the first process reads or writes data to a shared virtual page, the first process actually reads or writes data to a working page corresponding to the shared virtual page, thereby ensuring that no conflict is caused when multiple processes read or write data to one same shared virtual page. Each working page corresponds to one shared virtual memory page, and if the first process copies multiple shared virtual pages into the off-chip memory, the first process has multiple working pages accordingly. It should be noted that, in an embodiment, different scopes in the shared virtual memory of the application program to which the first process belongs are separately maintained by different processes or threads (that is, the case described in FIG. 5), and in this case, the copy unit 910 may obtain the data of the shared virtual memory page P from a home process of the shared virtual memory page P. In another embodiment, if an entire shared virtual memory space of the application program is jointly maintained by all processes of the application program, when reading or writing data to the shared virtual memory page P, the copy unit 910 does not need to obtain the data of the page P from a home process of P, but can directly read the data of the shared virtual memory page P.

The backup unit 920 is configured to, before the first process performs a write operation on the working page, create a backup page of the working page, and store the created backup page into on-chip memory of the computing node, so as to back up original data of the working page.

After the backup unit 920 successfully creates a backup page of a working page and stores the backup page into the on-chip memory, the data processing apparatus automatically jumps out of a page fault processing function of the first process, to trigger the first process to re-execute an instruction from a place at which a page fault occurs, and further perform a read or write operation on the data in the working page. Because a copy of the original data of the working page is maintained in the on-chip memory, no matter how the first process modifies the working page later, which part of content in the working page is modified by the process can be determined by comparing current data content of the working page with original data content in the backup page of the working page, and further the modified content can be synchronously updated into the shared virtual memory page corresponding to the working page.

The off-chip memory described in this embodiment of the present disclosure refers to a storage outside a CPU of the computing node, for example, memory or a hard disk of the computing node; the on-chip memory described in this embodiment of the present disclosure may be a storage in the CPU of the computing node, such as programmable on-chip memory (for example, a programmable on-chip memory MPB provided by an Intel SCC many-core platform); and further, the on-chip memory may be another storage scope in the CPU of the computing node except a cache (for example, an L1 cache or an L2 cache), and if the CPU of the computing node has multiple cores, the cores may share the on-chip memory. The on-chip memory does not have a large space, of which, however, an access latency is similar to that of a second-level cache L2 cache of the CPU of the computing node, and is a good resource.

Further, in another embodiment, assuming that the copy unit 910 copies N shared virtual memory pages into the off-chip memory of the computing node, and a quantity of working pages of the first process is M, where M and N both are positive integers greater than 1, the apparatus 90 for processing data further includes a determining unit 930 configured to, before the backup unit 920 stores the created backup page into the on-chip memory of the computing node, determine whether remaining space of the on-chip memory is less than a first threshold; and a trigger unit 940 configured to, when the determining unit 930 determines that the remaining space of the on-chip memory is less than the first threshold, trigger the first process to synchronously update modified content in the M working pages of the first process into the M shared virtual memory pages corresponding to the M working pages, and release space occupied by backup pages of the M working pages in the on-chip memory; and when the determining unit 930 determines that the remaining space of the on-chip memory is not less than the first threshold, trigger the backup unit 920 to store the created backup page into the on-chip memory of the computing node.

A process wherein the first process synchronously updates the modified content in the M working pages of the first process into the shared virtual memory pages corresponding to the working pages, and releases the space occupied by the backup pages of the working pages in the on-chip memory is referred to as "the first process executes a comparison (Diff) operation". In an embodiment, executing, by a process A, a comparison operation includes comparing each working page in all working pages of the process A with a backup page of the working page in on-chip memory, to obtain a data content difference between the two, that is, finding a part modified by the process A, of which data is changed, and generating a log file for recording the data content difference between the two, and updating, according to the log file, content modified by the process A in each working page into a shared virtual page corresponding to the working page. It should be noted that the operation of updating the shared virtual page according to the log file may be completed by the process A, or may be completed by a home process of the updated shared virtual page, which needs to be determined according to a specific application scenario.

After the backup unit 920 creates a backup page of a working page, if the remaining space of the on-chip memory is less than the first threshold, data of the working page cannot be backed up in the on-chip memory, and therefore the trigger unit 940 triggers the first process to perform a comparison operation, thereby releasing space of the on-chip memory, and refreshing data of a corresponding page in the shared virtual memory space; it may be understood that the first threshold may be set by persons skilled in the art by comprehensively considering factors such as a total capacity and an available storage space of the on-chip memory, or may be set according to an empirical value, which is not particularly limited.

It should be noted that, in this embodiment of the present disclosure, the backup unit 920 stores a backup page of a working page using space of the on-chip memory of the computing node; in a different application example, the space of the on-chip memory may be divided in a different manner, and correspondingly, in a different on-chip memory space division manner, working manners of the determining unit 930 and the trigger unit 940 are different accordingly.

In a first possible implementation manner, each process of the application program 1 to which the first process belongs has a separate on-chip storage scope in the on-chip memory; that is, the apparatus 90 for processing data further includes a memory allocation unit configured to allocate in advance an on-chip storage scope of a specific size in the on-chip memory of the computing node to each process of the application program 1; and in this case, the backup unit 920 is configured to store the created backup page into an on-chip storage scope that is allocated in advance by the memory allocation unit to the first process. Further, the determining unit 930 is configured to determine whether remaining space of the on-chip storage scope of the first process is less than a size of a backup page currently to be stored by the backup unit 920 or is less than a second threshold. Correspondingly, if the determining unit 930 determines that the remaining space of the on-chip storage scope of the first process is less than the size of the backup page currently to be stored by the backup unit 920 or is less than the second threshold, the trigger unit 940 triggers the first process to execute a comparison operation.

In a second possible implementation manner, all the processes of the application program 1 share the entire on-chip memory or a local scope in the on-chip memory, that is, all processes on the computing node can store a backup page into the on-chip memory. In this case, the determining unit 930 is configured to determine whether the remaining space of the on-chip memory of the computing node is less than a size of a backup page currently created and to be stored by the backup unit 920. Correspondingly, if the determining unit 930 determines that the remaining space of the on-chip memory of the computing node is less than the size of the backup page currently created and to be stored by the backup unit 920, the trigger unit 940 triggers a process to execute a comparison operation. Further, there are two policies for the trigger unit 940 to trigger a process to execute a comparison operation.

(1) Only the first process is triggered to execute a comparison operation, and another process of the application program is not affected.

(2) All the processes of the application program 1 to which the first process belongs are triggered to execute a comparison operation.

In a third possible implementation manner, the space of the on-chip memory of the computing node is not globally shared but locally shared, that is, only some processes can share a local scope in the on-chip memory. This on-chip memory division manner is that the entire space of the on-chip memory is divided into multiple mutually independent storage scopes, all the processes of the application program 1 are divided into one or more process groups, and processes in each process group share one in the multiple independent storage scopes, such that the storage scope is used as an on-chip common buffer of the process group; that is, the processes in each process group can access one same space of the on-chip memory, and different process groups access different spaces of the on-chip memory. For example, on-chip memory 1 can be accessed by a core 0 to a core 3, on-chip memory 2 can be accessed by a core 4 to a core 7, on-chip memory 3 can be accessed by a core 8 to a core 11, and on-chip memory 4 can be accessed by a core 12 to a core 15. All processes in a process group can store backup pages of working pages of the processes into a storage scope in the on-chip memory. In this on-chip memory division manner, the backup unit 920 is configured to store the created backup page into an on-chip common buffer of a process group in which the first process is located; and the determining unit 930 is configured to determine whether remaining space of the on-chip common buffer of the process group in which the first process is located is less than a size of a backup page currently created and to be stored by the backup unit 920 or is less than a second threshold. Correspondingly, if the determining unit 930 determines that the remaining space of the on-chip common buffer of the process group in which the first process is located is less than the size of the backup page currently created and to be stored by the backup unit 920 or is less than the second threshold, the trigger unit 940 triggers a process to execute a comparison operation. Further, there are two policies for the trigger unit 940 to trigger a process to execute a comparison operation.

(1) Only the first process is triggered to execute a comparison operation, and another process in the process group in which the first process is located is not affected.

(2) Failure information is broadcast in the process group in which the first process is located, and all processes in the process group are triggered to execute an active comparison operation.

It should be noted that a procedure of executing a comparison operation by a process is the same as that described above, and a procedure of executing a comparison operation by another process is similar to the procedure of executing a comparison operation by the first process, and details are not described herein again; it should be further noted that the second threshold may be set according to factors such as a total capacity and an available storage space of the on-chip memory, or may be set according to an empirical value, which is not particularly limited herein.

Further, because the on-chip memory of the computing node is generally globally shared, that is, it can be accessed by all cores of the computing node, this embodiment of the present disclosure proposes a solution of a backup page resource pool.

Because the on-chip memory can be accessed by all the cores, a backup page stored in the on-chip memory is also a shared resource, and can be shared by different cores. For example, multiple processes (on a same core or different cores) all perform a write operation in a time period at different positions of a page x, and according to the solutions in the foregoing embodiment, each process needs a separate backup page, which wastes a memory space. Because the on-chip memory can be accessed by all the cores, for one same version of one same shared virtual memory page of different processes, only one backup page needs to be stored in the space of the on-chip memory. Based on this, this embodiment of the present disclosure proposes a conception of a backup page resource pool, where a set of all backup pages maintained in the on-chip memory is referred to as a backup page resource pool. Correspondingly, the apparatus 90 for processing data further includes a query unit 950 configured to, before the backup unit 920 creates the backup page of the working page, query the on-chip memory of the computing node for the backup page of the working page; and correspondingly, only when the query unit 950 finds no backup page of the working page in the on-chip memory of the computing node, the backup unit 920 performs the step of creating a backup page of the working page.

In an embodiment, metadata information of backup pages in the on-chip memory may be recorded using a data structure in the on-chip memory of the computing node, such as a backup page queue or a backup page information table, where metadata information of a backup page includes a page number Twin Page Id and version number Twin Page Version of the backup page. In a more optimal embodiment, as shown in FIG. 8, metadata information of a backup page may include Twin Page Id, Twin Page Version, Twin Page Usage, and Twin Page Address. Definition of metadata information of a backup page is described above, and is not described herein again. It may be understood that, because on-chip memory resources of the computing node are valuable, to reduce occupation on the on-chip memory, the backup page information table may also be stored in the off-chip memory of the computing node.

Based on the backup page information table, in the apparatus 90 for processing data provided in this embodiment of the present disclosure, the query unit 950 is configured to query the backup page information table for metadata information of which a page number and a version number are respectively the same as a page number and a version number of the working page; and the backup unit 920 is configured to, when the query unit 950 finds no metadata information of which a page number and a version number are respectively the same as the page number and the version number of the working page, create the backup page of the working page; and when the query unit 950 finds metadata information of which a page number and a version number are respectively the same as the page number and the version number of the working page, use a backup page corresponding to the found metadata information as the backup page of the working page.

Further, in an embodiment, the apparatus 90 for processing data further includes a record unit 960 configured to, after the backup unit 920 creates the backup page of the working page, record the page number and the version number of the working page respectively as a page number and a version number of the created backup page into the backup page information table.

In another embodiment, the space of the on-chip memory of the computing node may be not globally shared but locally shared, that is, the entire space of the on-chip memory is divided into multiple mutually independent storage scopes; and correspondingly, all the processes of the application program 1 to which the first process belongs are divided into at least one process group, processes in each process group share one storage scope in the multiple independent storage scopes, such that the storage scope is used as an on-chip common buffer of the process group, each process group maintains a separate backup page information table, and the backup page information table of each process group includes metadata information of all backup pages of all processes in the process group. Definition of metadata information of a backup page is described above, and is not described herein again. In this case in which the on-chip memory is locally shared, the query unit 950 of the apparatus 90 for processing data is configured to query a backup page information table of a process group in which the first process is located for metadata information of which a page number and a version number are respectively the same as a page number and a version number of the working page; and the backup unit 920 is configured to, when the query unit 950 finds no metadata information of which a page number and a version number are respectively the same as the page number and the version number of the working page, create the backup page of the working page; and further, when the query unit 950 finds metadata information of which a page number and a version number are respectively the same as the page number and the version number of the working page, use a backup page corresponding to the found metadata information as the backup page of the working page.

Correspondingly, the record unit 960 of the apparatus 90 for processing data is configured to, after the backup unit 920 creates the backup page of the working page, record the page number and the version number of the working page into the backup page information table of the process group in which the first process is located respectively as a page number and a version number of the created backup page.

Figure 11:
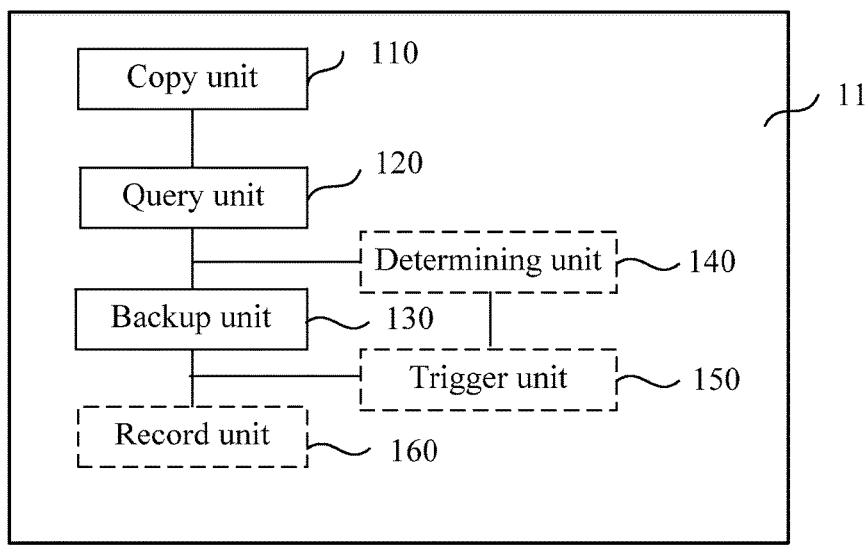
FIG. 11 is a schematic diagram of another apparatus for processing data according to an embodiment of the present disclosure.

As shown in FIG. 11, an embodiment of the present disclosure provides another apparatus 11 for processing data, including a copy unit 110 configured to copy a shared virtual memory page to which a first process requests access into off-chip memory of a computing node, and use the shared virtual memory page copied into the off-chip memory as a working page of the first process, where the shared virtual memory page is a virtual memory page in shared virtual memory of an application program to which the first process belongs, and the application program runs on the computing node; a query unit 120 configured to, before the first process performs a write operation on the working page, query on-chip memory of the computing node for a backup page of the working page; and a backup unit 130 configured to, when the query unit 120 finds a backup page of the working page in the on-chip memory of the computing node, determine the found backup page as a backup page of the working page; and further, when the query unit 120 finds no backup page of the working page in the on-chip memory of the computing node, the backup unit 130 creates a backup page of the working page, and stores the created backup page into the on-chip memory of the computing node, where the backup page of the working page is used for backing up original data of the working page.

Preferably, in an embodiment, if a quantity of shared virtual memory pages to which the first process requests access is N, and a quantity of working pages of the first process is M, where M and N both are positive integers greater than or equal to 1, the apparatus 11 for processing data further includes a determining unit 140 configured to, before the backup unit 130 stores the created backup page into the on-chip memory of the computing node, determine whether remaining space of the on-chip memory is less than a first threshold; and a trigger unit 150 configured to, when the determining unit 140 determines that the remaining space of the on-chip memory is less than the first threshold, trigger the first process to synchronously update modified content in the M working pages of the first process into the M shared virtual memory pages corresponding to the M working pages, and release space occupied by backup pages of the M working pages in the on-chip memory.

In an implementation manner, metadata information of backup pages in the on-chip memory may be recorded using a data structure in the on-chip memory of the computing node, such as a backup page queue or a backup page information table, where metadata information of a backup page includes a page number Twin Page Id and version number Twin Page Version of the backup page. In a more optimal embodiment, as shown in FIG. 8, metadata information of a backup page may include Twin Page Id, Twin Page Version, Twin Page Usage, and Twin Page Address. Meanings of the fields are as follows.

Twin Page Id: A page number of a shared virtual memory page to which a working page corresponding to a backup page is mapped, where in different processes, page numbers of one same shared virtual memory page are the same.

Twin Page Version: A version number of the backup page, where in different processes, version numbers of backup pages corresponding to one same shared virtual memory page may be different.

It should be noted that a version number of a backup page is the same as a version number of a working page corresponding to the backup page, and the version number of the working page is a version number of a shared virtual memory page corresponding to the working page when the backup unit 130 creates the working page. When the backup unit 130 creates a working page, that is, copies a shared virtual memory page into the off-chip memory of the computing node as a working page of the process, a version number of the working page is a version number of the copied shared virtual memory page; generally, an initial value of a version number of a shared virtual memory page is 1, different processes all may perform read and write operations on data in the shared virtual memory page later, and each time a process updates content in the shared virtual memory page, the version number of the shared virtual memory page increases. Therefore, in different processes, version numbers of working pages corresponding to one same shared virtual memory page may be different, further causing that version numbers of backup pages corresponding to the shared virtual memory page are also different.

Twin Page Usage: Usage of the backup page, which records a quantity of processes that currently use the backup page of the version.

Twin Page Address: An address of the backup page in programmable on-chip memory, where a process may access the backup page of the corresponding version according to the address.

It may be understood that, because on-chip memory resources of the computing node are valuable, to reduce occupation on the on-chip memory, the backup page information table may also be stored in the off-chip memory of the computing node. Based on the backup page information table, in the apparatus 11 for processing data provided in this embodiment of the present disclosure, the query unit 120 is configured to query the backup page information table for metadata information of which a page number and a version number are respectively the same as a page number and a version number of the working page; and the backup unit 130 is configured to, when the query unit 120 finds metadata information of which a page number and a version number are respectively the same as the page number and the version number of the working page, determine a backup page corresponding to the found metadata information as the backup page of the working page.

Further, in an embodiment, the apparatus 11 for processing data further includes a record unit 160 configured to, after the backup unit 130 creates the backup page of the working page, record the page number and the version number of the working page respectively as a page number and a version number of the created backup page into the backup page information table.

In another embodiment, space of the on-chip memory of the computing node may be not globally shared but locally shared, that is, the entire space of the on-chip memory is divided into multiple mutually independent storage scopes; and correspondingly, all the processes of the application program 1 to which the first process belongs are divided into at least one process group, processes in each process group share one storage scope in the multiple independent storage scopes, such that the storage scope is used as an on-chip common buffer of the process group, each process group maintains a separate backup page information table, and the backup page information table of each process group includes metadata information of all backup pages of all processes in the process group. Definition of metadata information of a backup page is described above, and is not described herein again. In this case in which the on-chip memory is locally shared, the query unit 120 of the apparatus 11 for processing data is configured to query a backup page information table of a process group in which the first process is located for metadata information of which a page number and a version number are respectively the same as a page number and a version number of the working page; and the backup unit 130 is configured to, when the query unit 120 finds metadata information of which a page number and a version number are respectively the same as the page number and the version number of the working page, determine a backup page corresponding to the found metadata information as the backup page of the working page.

Correspondingly, the record unit 160 of the apparatus 11 for processing data is configured to, after the backup unit 130 creates the backup page of the working page, record the page number and the version number of the working page into the backup page information table of the process group in which the first process is located respectively as a page number and a version number of the created backup page.

It should be noted that, as based on the same disclosure idea with the method embodiments of the present disclosure, for content such as implementation processes of the modules in the apparatuses for processing data shown in FIG. 10 and FIG. 11 and information exchange between the modules, reference may be made to the method embodiments, and details are not described herein again.

It should be noted that, in actual application, the apparatuses for processing data 90 and 11 in the embodiments of the present disclosure may be a computing node, that is, a device (for a schematic architectural diagram thereof, reference may be made to FIG. 3) having a processor and a storage, of which a product form may be a general-purpose computer, a cloud computer, a computing node in a distributed system, an embedded platform, a server, or the like, or may be a software system such as an operating system or an LIB library, which is not limited in the present disclosure.

In this embodiment of the present disclosure, using the foregoing technical solutions, a shared virtual memory page that a process requests to read or write data to is first copied into off-chip memory of a computing node, the copy is used as a working page on which the process can perform read and write operations, and before the process performs a write operation on the working page, original data in the working page is backed up in the on-chip memory using on-chip memory of a CPU of the computing node, so as to ensure data consistency when multiple processes perform an operation on the shared virtual memory page. Because a backup page is stored in the on-chip memory, an access speed of the page can be ensured, and the backup page and the working page are stored separately, such that the backup page does not contend with the working page for space of a cache and more working pages can be stored in the cache, and therefore running performance of a program can be improved. Further, content of the shared virtual memory page is updated in time by performing an actively triggered comparison operation, and it is ensured that when the comparison operation is performed, the working page is basically still located in the cache, such that access to the off-chip memory is not required, and therefore a speed of the Diff operation is very fast. Further, by using a solution of a backup page resource pool, processes can fully share a backup page, further reducing space, occupied by a backup page, of the on-chip memory, and storing a system resource.

Figure 12:
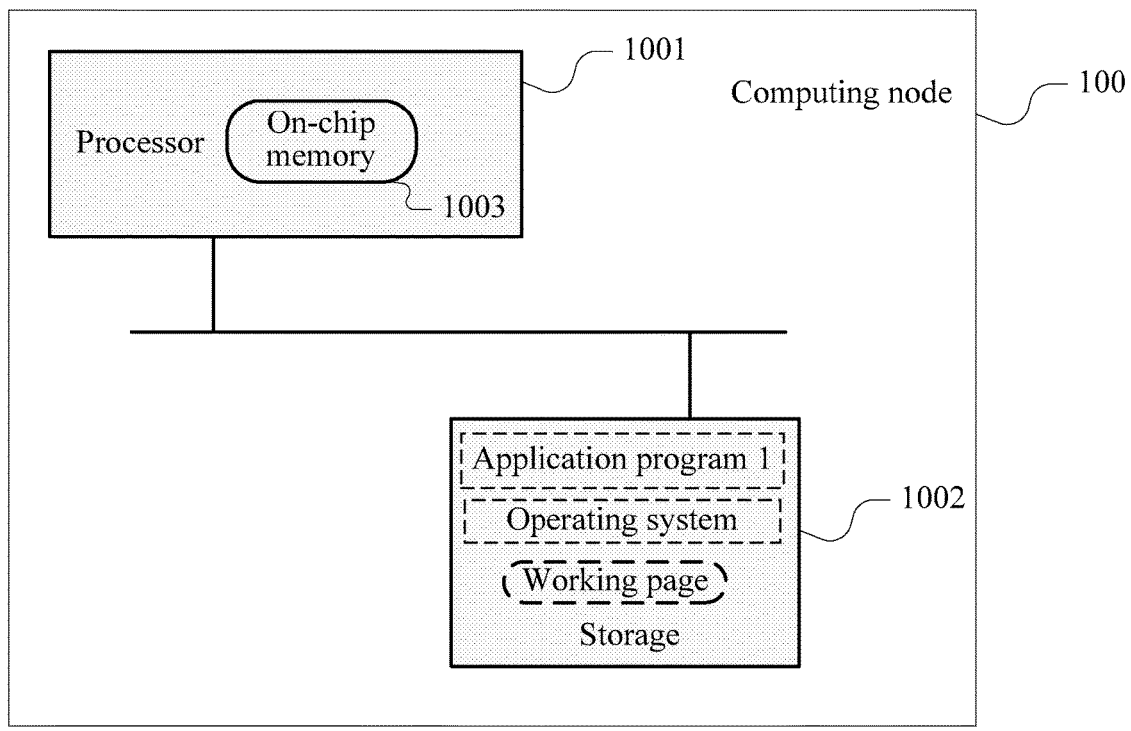
FIG. 12 is a schematic diagram of a computing node according to an embodiment of the present disclosure.

FIG. 12 is a schematic diagram of a computing node according to an embodiment of the present disclosure. As shown in FIG. 12, the computing node 100 includes at least one processor 1001, a storage 1002, and a bus, where the processor 1001 includes on-chip memory 1003 inside. The processor 1001 and the storage 1002 are connected and communicate with each other using the bus. The bus may be an Industry Standard Architecture (ISA) bus, a Peripheral Component Interconnect (PCI) bus, an Extended Industry Standard Architecture (EISA) bus, or the like. The bus may include an address bus, a data bus, a control bus, and the like. For ease of indication, the bus is indicated using only one bold line in FIG. 12, but it does not indicate that there is only one bus or one type of bus.

The storage 1002 is configured to store data and executable program code, where the program code includes a computer operation instruction. The storage 1002 may include a high-speed random access memory (RAM) memory, and may further include a non-volatile memory, for example, at least one magnetic disk storage.

In an embodiment, the storage 1002 stores executable code corresponding to an application program 1, the processor 1001 reads the executable program code stored in the storage 1002 to run a program corresponding to the executable program code, where the application program 1 includes one or more processes, the processes of the application program 1 have a same piece of shared virtual memory, and each process separately maps some or all virtual memory pages in the shared virtual memory to a private physical memory space maintained by the process; and further, the storage 1002 further stores executable code corresponding to an operating system, and the processor 1001 reads and executes the executable code, corresponding to the operating system, in the storage 1002, so as to copy a shared virtual memory page to which a first process of the application program 1 requests access into the storage 1002 of the computing node, and use the shared virtual memory page copied into the storage 1002 as a working page of the first process of the application program 1, where the shared virtual memory page to which the first process requests access is a virtual memory page that the first process requests to read or write data to in the shared virtual memory of the application program 1; and, before the first process performs a write operation on the working page, create a backup page of the working page, and store the created backup page into the on-chip memory 1003, so as to back up original data of the working page.

For details of the foregoing procedure, reference may be made to the foregoing method and apparatus embodiments, which are not described herein again.

It should be noted that the processor 1001 may be a CPU or an application specific integrated circuit (ASIC), or be configured to be one or more integrated circuits implementing the embodiments of the present disclosure, and the processor 1001 may include one or multiple cores, and the cores share the on-chip memory 1003 of the processor 1001.

In addition, besides the foregoing method procedure, the processor 1001 may be further configured to execute executable code, so as to implement other steps in the method embodiments of the present disclosure, and details are not described herein again.

In this embodiment of the present disclosure, using the foregoing technical solutions, a shared virtual memory page that a process requests to read or write data to is first copied into off-chip memory of a computing node, the copy is used as a working page on which the process can perform read and write operations, and before the process performs a write operation on the working page, original data in the working page is backed up in the on-chip memory using on-chip memory of a CPU of the computing node, so as to ensure data consistency when multiple processes perform an operation on the shared virtual memory page. Because a backup page is stored in the on-chip memory, an access speed of the page can be ensured, and the backup page and the working page are stored separately, such that the backup page does not contend with the working page for space of a cache and more working pages can be stored in the cache, and therefore running performance of a program can be improved. Further, content of the shared virtual memory page is updated in time by performing an actively triggered comparison operation, and it is ensured that when the comparison operation is performed, the working page is basically still located in the cache, such that access to the off-chip memory is not required, and therefore a speed of the Diff operation is very fast. Further, by using a solution of a backup page resource pool, processes can fully share a backup page, further reducing space, occupied by a backup page, of the on-chip memory, and storing a system resource.

Figure 13:
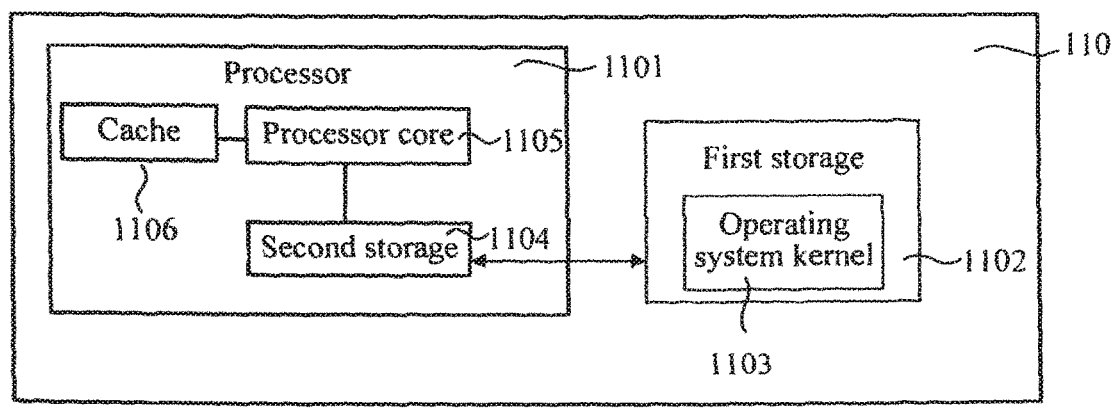
FIG. 13 is a schematic diagram of a computer system according to an embodiment of the present disclosure.

FIG. 13 is a schematic diagram of a computer system according to an embodiment of the present disclosure. As shown in FIG. 13, the computer system 110 includes a processor 1101, a first storage 1102, and an operating system kernel 1103, where the processor 1101 includes a second storage 1104 and at least one processor core 1105 inside, the processor core is configured to run an application program, the second storage 1104 is an on-chip storage shared by the processor cores of the processor 1101, and a data access speed of the second storage 1104 is greater than a data access speed of the first storage 1102; and the operating system kernel 1103 is configured to copy a shared virtual memory page to which a first process of the application program requests access into the first storage 1102, and use the shared virtual memory page copied into the first storage 1102 as a working page of the first process; and before the first process performs a write operation on the working page, create a backup page of the working page, and store the created backup page into the second storage 1104, so as to back up original data of the working page, where the shared virtual memory page is a virtual memory page in shared virtual memory of the application program to which the first process belongs.

In an embodiment, a quantity of shared virtual memory pages is N, where N is a positive integer greater than or equal to 1; and a quantity of working pages of the first process is M, where M is a positive integer greater than or equal to 1; and the operating system kernel 1103 is further configured to, before storing the created backup page into the second storage, determine whether remaining space of the second storage 1104 is less than a first threshold, and if the remaining space of the second storage 1104 is less than the first threshold, trigger the first process to synchronously update modified content in the M working pages of the first process into the M shared virtual memory pages corresponding to the M working pages, and release space occupied by backup pages of the M working pages in the second storage 1104; and if the remaining space of the first storage 1102 is not less than the first threshold, perform the step of storing the created backup page into the second storage 1104.

Further, in another embodiment, the second storage 1104 stores a backup page information table, where the backup page information table includes metadata information of all backup pages in the second storage 1104, and metadata information of each backup page includes a page number and a version number of each backup page, and the page number and the version number of each backup page are respectively the same as a page number and a version number of a working page corresponding to each backup page; and in this case, before creating the backup page of the working page, the operating system kernel 1103 queries the backup page information table for metadata information of which a page number and a version number are respectively the same as a page number and a version number of the working page, and if metadata information of which a page number and a version number are respectively the same as the page number and the version number of the working page is found, determines a backup page corresponding to the found metadata information as the backup page of the working page.

It may be understood that, to reduce occupation on a storage space of the second storage 1104, the backup page information table may also be stored in the first storage 1102; in another embodiment, the processor 1101 further includes a cache 1106 configured to cache temporary data of the processor cores. In addition, for operation steps of the operating system kernel 1103 in this embodiment of the present disclosure, reference may be made to the foregoing method embodiments, and details are not described herein again.

In this embodiment of the present disclosure, using the foregoing technical solutions, a shared virtual memory page that a process requests to read or write data to is first copied into off-chip memory of a computing node, the copy is used as a working page on which the process can perform read and write operations, and before the process performs a write operation on the working page, original data in the working page is backed up in the on-chip memory using on-chip memory of a CPU of the computing node, so as to ensure data consistency when multiple processes perform an operation on the shared virtual memory page. Because a backup page is stored in the on-chip memory, an access speed of the page can be ensured, and the backup page and the working page are stored separately, such that the backup page does not contend with the working page for space of a cache and more working pages can be stored in the cache, and therefore running performance of a program can be improved. Further, content of the shared virtual memory page is updated in time by performing an actively triggered comparison operation, and it is ensured that when the comparison operation is performed, the working page is basically still located in the cache, such that access to the off-chip memory is not required, and therefore a speed of the comparison operation is very fast. Further, in a manner in which a backup page is shared, processes can fully share a backup page, further reducing space, occupied by a backup page, of the on-chip memory, and storing a system resource.

In the several embodiments provided in the present application, it should be understood that the disclosed apparatus and method may be implemented in other manners. For example, the apparatus embodiments described above are merely exemplary.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in network devices provided by the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for processing data, comprising:
copying a shared virtual memory page to which a first process requests access into off-chip memory of a computing node, wherein the off-chip memory is located outside a central processing unit (CPU) of the computing node, and using the shared virtual memory page copied into the off-chip memory as a working page of the first process, wherein the shared virtual memory page is a virtual memory page in shared virtual memory of an application program to which the first process belongs, and wherein the application program runs on the computing node;
creating a backup page of the working page, before the first process performs a write operation on the working page; and
storing the backup page into on-chip memory of the computing node, wherein the on-chip memory is located in the CPU of the computing node, so as to back up original data of the working page,
wherein a quantity of working pages of the first process is M,
wherein M is a positive integer greater than or equal to 1, and
wherein, before the storing, the method further comprises:
determining whether remaining space of the on-chip memory is less than a first threshold,
when the remaining space is less than the first threshold, triggering the first process to synchronously update modified content in the M working pages into M shared virtual memory pages corresponding to the M working pages and releasing space occupied by backup pages of the M working pages, and
when the remaining space is greater than or equal to the first threshold, performing the storing.

2. The method according to claim 1, wherein, before the creating of the backup page of the working page, the method further comprises allocating in advance an on-chip storage scope of a specific size in the on-chip memory of the computing node to the first process; and wherein the storing of the backup page into the on-chip memory of the computing node comprises storing the backup page into the on-chip storage scope that is allocated in advance to the first process.

3. The method according to claim 2, wherein the determining whether remaining space of the on-chip memory is less than a first threshold, and when the remaining space of the on-chip memory is less than the first threshold, triggering the first process to synchronously update modified content in the M working pages of the first process into the M shared virtual memory pages corresponding to the M working pages and release space occupied by backup pages of the M working pages in the on-chip memory, and when the remaining space of the on-chip memory is greater than or equal to the first threshold, performing the step of storing the backup page into the on-chip memory of the computing node comprises: determining whether the remaining space of the on-chip storage scope of the first process is less than at least one of a size of the backup page and a second threshold, and when the remaining space of the on-chip storage scope of the first process is less than at least one of the size of the backup page and the second threshold, triggering the first process to synchronously update the modified content in the M working pages of the first process into the M shared virtual memory pages corresponding to the M working pages and release the space occupied by the backup pages of the M working pages in the on-chip memory, and when the remaining space of the on-chip storage scope of the first process is greater than or equal to at least one of the size of the backup page and the second threshold, performing the step of storing the backup page into the on-chip memory of the computing node.

4. The method according to claim 1, wherein the method further comprises, before the creating of the backup page of the working page, querying the on-chip memory of the computing node for the backup page of the working page; and wherein the creating of the backup page of the working page comprises, when no backup page of the working page is found in the on-chip memory of the computing node, creating the backup page of the working page.

5. A method for processing data comprising:
copying a shared virtual memory page to which a first process requests access into off-chip memory of a computing node, wherein the off-chip memory is located outside a central processing unit (CPU) of the computing node, and using the shared virtual memory page copied into the off-chip memory as a working page of the first process, wherein the shared virtual memory page is a virtual memory page in shared virtual memory of an application program to which the first process belongs, and wherein the application program runs on the computing node;
querying on-chip memory of the computing node for a backup page of the working page, wherein the on-chip memory is located in the CPU of the computing node, before the first process performs a write operation on the working page;
when a backup page of the working page is found, determining the backup page as the backup page of the working page, wherein the backup page stores original data in the working page;
when no backup page of the working page is found, creating a backup page of the working page; and
storing the backup page into the on-chip memory of the computing node,
wherein a quantity of working pages of the first process is M,
wherein M is a positive integer greater than or equal to 1, and
wherein, before the storing, the method further comprises:
determining whether remaining space of the on-chip memory is less than a first threshold,
when the remaining space is less than the first threshold, triggering the first process to synchronously update modified content in the M working pages into M shared virtual memory pages corresponding to the M working pages and releasing space occupied by backup pages of the M working pages, and
when the remaining space is not less than the first threshold, performing the storing.

6. An apparatus for processing data, the apparatus comprising a processor, a storage, a bus, off-chip memory and on-chip memory, wherein the off-chip memory is located outside the processor and the on-chip memory is located in the processor, wherein the processor and the storage are connected and communicate with each other using the bus, wherein the storage is configured to store data and executable program code, and wherein the processor is configured to read the executable program code stored in the storage to:
copy a shared virtual memory page to which a first process requests access into the off-chip memory, and use the shared virtual memory page copied into the off-chip memory as a working page of the first process, wherein the shared virtual memory page is a virtual memory page in shared virtual memory of an application program to which the first process belongs, and wherein the application program runs on the apparatus; and
before the first process performs a write operation on the working page, create a backup page of the working page, and store the backup page into the on-chip memory, so as to back up original data of the working page, wherein a quantity of working pages of the first process is M, wherein M is a positive integer greater than or equal to 1, and wherein the processor is further configured to read the executable program code stored in the storage to:
before the storing, determine whether remaining space of the on-chip memory is less than a first threshold, when the remaining space is less than the first threshold, trigger the first process to synchronously update modified content in the M working pages into M shared virtual memory pages corresponding to the M working pages and release space occupied by backup pages of the M working pages.

7. The apparatus for processing data according to claim 6, wherein the processor is further configured to read the executable program code stored in the storage to allocate in advance an on-chip storage scope of a specific size in the on-chip memory of the apparatus to each process of the application program to which the first process belongs and store the backup page into an on-chip storage scope that is allocated in advance to the first process.

8. The apparatus for processing data according to claim 7, wherein the processor is further configured to read the executable program code stored in the storage to determine whether remaining space of the on-chip storage scope of the first process is less than at least one of a size of the backup page and a second threshold; and when the processor determines that the remaining space of the on-chip storage scope of the first process is less than at least one of the size of the backup page and the second threshold, the processor triggers the first process to synchronously update the modified content in the M working pages of the first process into the M shared virtual memory pages corresponding to the M working pages and release the space occupied by the backup pages of the M working pages in the on-chip memory.

9. The apparatus for processing data according to claim 8, wherein the processor is further configured to read the executable program code stored in the storage to, before creating the backup page of the working page, query the on-chip memory of the apparatus for the backup page of the working page, and when the processor finds no backup page of the working page in the on-chip memory of the apparatus, the processor is further configured to create the backup page of the working page.

10. An apparatus for processing data, the apparatus comprising a processor, a storage, a bus, off-chip memory and on-chip memory, wherein the off-chip memory is located outside the processor and the on-chip memory is located in the processor, wherein the processor and the storage are connected and communicate with each other using the bus, wherein the storage is configured to store data and executable program code, and wherein the processor is configured to read the executable program code stored in the storage to:
copy a shared virtual memory page to which a first process requests access into the off-chip memory, and use the shared virtual memory page copied into the off-chip memory as a working page of the first process, wherein the shared virtual memory page is a virtual memory page in shared virtual memory of an application program to which the first process belongs, and wherein the application program runs on the apparatus;
before the first process performs a write operation on the working page, query the on-chip memory for a backup page of the working page;
when the processor finds a backup page of the working page in the on-chip memory, determine the backup page as the backup page of the working page, wherein the backup page is used for backing up original data in the working page; and
when the processor finds no backup page of the working page in the on-chip memory, create a backup page of the working page and store the backup page in the on-chip memory, wherein a quantity of working pages of the first process is M, wherein M is a positive integer greater than or equal to 1, and wherein the processor is further configured to read the executable program code stored in the storage to:
before the storing, determine whether remaining space of the on-chip memory is less than a first threshold, when the remaining space is less than the first threshold, trigger the first process to synchronously update modified content in the M working pages into M shared virtual memory pages corresponding to the M working pages, and
release space occupied by backup pages of the M working pages.

11. A computer system comprising a processor, a first storage located outside the processor, and an operating system kernel, wherein the processor is configured to run an application program, wherein the processor comprises a second storage inside, and wherein a data access speed of the second storage is greater than a data access speed of the first storage; and wherein the operating system kernel is configured to copy a shared virtual memory page to which a first process requests access of the application program into the first storage, and use the shared virtual memory page copied into the first storage as a working page of the first process; and before the first process performs a write operation on the working page, create a backup page of the working page and store the backup page into the second storage so as to back up original data of the working page, wherein the shared virtual memory page is a virtual memory page in shared virtual memory of the application program;
wherein the second storage stores a backup page information table;
wherein the backup page information table comprises metadata information of all backup pages in the second storage;
wherein the metadata information comprises a page number and a version number of each backup page;
wherein the page number and the version number of each backup page are respectively the same as a page number and a version number of a working page corresponding to each backup page; and
wherein the operating system kernel is configured to:
before the first process performs a write operation on the working page for a first time, query the backup page information table for metadata information of which a page number and a version number are respectively the same as a page number and a version number of the working page,
when no metadata information of which a page number and a version number are respectively the same as the page number and the version number of the working page is found, create the backup page and store the backup page into the second storage so as to back up the original data, and
when metadata information of which a page number and a version number are respectively the same as the page number and the version number of the working page is found, determine a backup page corresponding to the metadata information as the backup page.

\* \* \* \* \*